US009540049B2

(12) United States Patent
Karube et al.

(10) Patent No.: US 9,540,049 B2
(45) Date of Patent: Jan. 10, 2017

(54) FLOOR SUPPORT STRUCTURE OF VEHICLE

(71) Applicant: HONDA MOTOR CO., LTD., Tokyo (JP)

(72) Inventors: Shinichi Karube, Wako (JP); Takeshi Kamiyama, Wako (JP); Yoshihiro Tano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/670,603

(22) Filed: Mar. 27, 2015

(65) Prior Publication Data

US 2015/0274215 A1   Oct. 1, 2015

(30) Foreign Application Priority Data

Mar. 31, 2014  (JP) ................. 2014-073705

(51) Int. Cl.
| B62D 25/20 | (2006.01) |
| B62D 27/02 | (2006.01) |
| B62D 21/09 | (2006.01) |
| B62D 23/00 | (2006.01) |

(52) U.S. Cl.
CPC ............. *B62D 25/20* (2013.01); *B62D 23/005* (2013.01)

(58) Field of Classification Search
CPC ....... B62D 25/20; B62D 23/005; B62D 21/09; B62D 27/02

USPC .................................................... 296/193.07
See application file for complete search history.

(56) References Cited

U.S. PATENT DOCUMENTS 7,614,684 B2 * 11/2009 Yasuhara ............. B60K 15/063
180/69.4
7,753,427 B2 * 7/2010 Yamamura ............. B60K 13/04
180/309

FOREIGN PATENT DOCUMENTS

JP           4132746 B2     8/2008

* cited by examiner

*Primary Examiner* — Joseph D Pape
*Assistant Examiner* — Dana Ivey
(74) *Attorney, Agent, or Firm* — Squire Patton Boggs (US) LLP

(57) ABSTRACT

A floor support structure of a vehicle comprises a floor extending in the vehicle width direction so as to allow occupants sitting side by side in the vehicle width direction to put their feet thereon. The floor includes a plane surface part and separating a vehicle interior from a vehicle exterior, a body for supporting each of front and rear end portions of the floor in the forward and rearward direction of the vehicle and each of left and right end portions of the floor in the vehicle width direction, and a floor stay making contact with a lower surface in or around the middle in the vehicle width direction of the floor so as to support the floor. The floor stay comprises a plurality of main stays and a sub-stay.

10 Claims, 12 Drawing Sheets

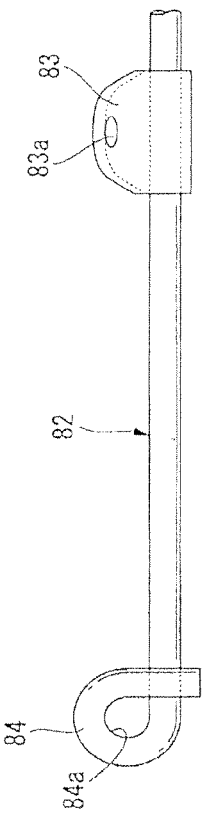
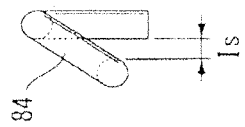

FLOOR SUPPORT STRUCTURE OF VEHICLE

BACKGROUND

Field

The present invention relates to a floor support structure of a vehicle.

Description of the Related Art

A floor support structure of a vehicle is disclosed in patent reference 1 (Japanese Patent No. 4,132,746), for example. This floor support structure includes a support member extending from a vehicle body frame, a first wire rod frame extending from a distal end portion of the support member to the vehicle body frame, the first frame being suspended from the vehicle body frame by a second wire rod frame, and a foot board covering the first frame and the support member. The foot board covers the first wire rod frame and the support member so as to distribute a load to these members, so that each of component members can be prevented from plastic deformation under a load from the ground and can provide flexibility.

However, displacement in the vehicle width direction of the first frame and the second frame is not able to be restrained by the structure disclosed in the patent reference 1.

Moreover, it is required that a stay is added in an intermediate portion of the first frame and both ends of the second frame are connected to the vehicle body frame and the first frame, respectively. However, this incurs complication of manufacturing and assembling and so is undesirable.

For this reason, a structure is needed which is able to easily suppress the displacement in each of the forward and rearward direction of the vehicle and the vehicle width direction with respect to each of the component members.

SUMMARY

The present invention has an objective of providing a floor support structure capable of easily suppressing the displacement in each of the forward and rearward direction of the vehicle and the vehicle width direction with respect to each of the component members.

According to a first embodiment of the present invention, there is provided a floor support structure of a vehicle comprising a floor extending in the vehicle width direction so as to allow occupants sitting side by side in the vehicle width direction to put their feet thereon. The floor contains a plane surface part and separating a vehicle interior from a vehicle exterior, a body for supporting each of front and rear end portions of the floor in the forward and rearward direction of the vehicle and each of left and right end portions of the floor in the vehicle width direction, and a floor stay making contact with a lower surface in or around the middle in the vehicle width direction of the floor so as to support the floor. The floor stay comprises a plurality of main stays which extend between a first section of the body located near the front end portion of the floor in the forward and rearward direction of the vehicle and a second section of the body located near the rear end portion of the floor in the forward and rearward direction of the vehicle so as to bear a load on the floor from above, and a sub-stay which extends between the main stays located left and right in the vehicle width direction so as to restrain displacement in the vehicle width direction of each of the main stays.

According to a second embodiment of the present invention, the floor stay is fastened to the floor through at least one mounting portion provided in the sub-stay.

According to a third embodiment of the present invention, the floor has a tunnel section which extends in the forward and rearward direction of the vehicle in or around the middle in the vehicle width direction and which is convexed upwardly, and the floor stay is arranged in the tunnel section.

According to a fourth embodiment of the present invention, each of the main stays and the sub-stay is made of a wire rod of circular cross section, the sub-stay is formed with a plurality of coiled engaging portions each of which is wound in a state of forming a space equal to or greater than a diameter of each of the main stays, and each of the engaging portions of the sub-stay is configured to engage each of the main stays of the floor stay.

According to a fifth embodiment of the present invention, the floor is divided at an intermediate position thereof in the forward and rearward direction of the vehicle into a first cover on the front side and a second cover on the rear side, and the first cover and the second cover overlap with each other at divided sections thereof located at the intermediate position in the forward and rearward direction of the vehicle, wherein, in a condition where one of the first cover and the second cover is removed, a fastening portion for fastening the sub-stay is formed in the divided section of the other of the first cover and the second cover.

According to the first embodiment of the present invention, since the plurality of main stays extend in the forward and rearward direction of the vehicle and are arranged at spaced intervals in the vehicle width direction, the floor extending in the vehicle width direction is supported in such a way as to distribute the load on the floor from above, and the displacement of each of the main stays in the forward and rearward direction of the vehicle can be restrained. Moreover, since the sub-stay extends between the main stays located left and right in the vehicle width direction so as to restrain displacement in the vehicle width direction of each of the main stays, there is no need for the sub-stay to be supported on the body by a separate support member and the like. In addition, the floor is a member containing the plane surface part, and the front and rear end portions of the floor in the forward and rearward direction of the vehicle and the left and right end portions of the floor in the vehicle width direction each are supported on the body. Therefore, the floor is hardly displaced in the forward and rearward direction of the vehicle and in the vehicle width direction. Accordingly, the displacement of each of the component members in each of the forward and rearward direction of the vehicle and the vehicle width direction can be easily suppressed.

According to the second embodiment of the present invention, since the floor stay is fastened to the floor at one place at least in the middle position in the vehicle width direction, the displacement of each of the floor stay and the floor in the forward and rearward direction of the vehicle and in the vehicle width direction can be easily suppressed.

According to the third embodiment of the present invention, since the floor stay is arranged in the tunnel section, the displacement of each of the floor stay and the floor in the forward and rearward direction of the vehicle and in the vehicle width direction can be easily and effectively suppressed.

According to the fourth embodiment of the present invention, since the plurality of the engaging portions of the sub-stay are configured to engage each of the main stays, special machining and fastening are not required.

According to the fifth embodiment of the present invention, in a condition where one of the first cover and the second cover is removed, the sub-stay can be easily mounted on the fastening portion of the divided section of the other of the first cover and the second cover. In addition, even if the floor is divided into the first cover and the second cover, the first cover and the second cover overlap with each other at the divided sections thereof. Therefore, there is no need to provide a separate connecting member and the like, whereby the number of component parts is not increased.

BRIEF DESCRIPTION OF THE DRAWINGS

FIGS. 8(a) and 8(b) are schematic views in which 8(a) is a side view of a sub-stay and 8(b) is a front view of the sub-stay;

DETAILED DESCRIPTION

Figure 1:
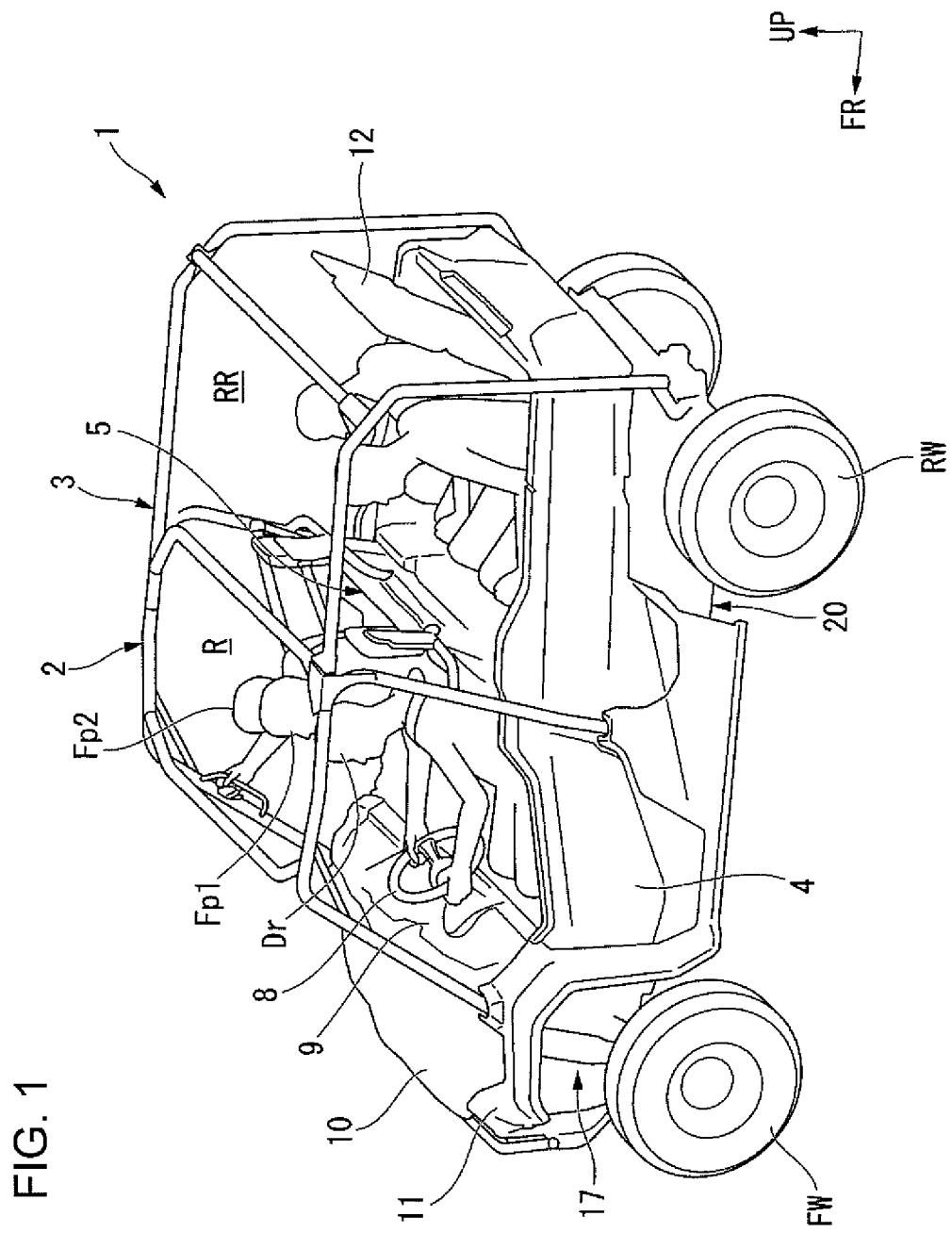
FIG. 1 is a perspective view of a vehicle in accordance with an embodiment of the present invention.

Hereinafter, embodiments of the present invention will be explained with reference to accompanying drawings.

In the following description, the orientation such as front, rear, left, right and the like shall be identical to the orientation of a vehicle to be explained hereunder, unless otherwise stipulated. Moreover, at proper places in the drawings to be used in the following explanation, there are designated an arrow FR indicating the forward direction of the vehicle, an arrow LH indicating the left direction of the vehicle and an arrow UP indicating the upward direction of the vehicle. In addition, a line CL in the drawing indicates a center line in the left and right direction of the vehicle.

According to an embodiment, a four-wheeled vehicle 1 (hereinafter, referred to simply as a "vehicle 1") shown in FIG. 1 is a side by side type MUV (multi utility vehicle) in which three occupants Dr, Fp1, Fp2 ride side by side in the vehicle width direction in a front seat. The vehicle 1 is provided with a pair of left and right front wheels FW functioning as a steering wheel on each of left and right sides in a vehicle front part and with a pair of left and right rear wheels RW functioning as a driving wheel on each of left and right sides in a vehicle rear part.

The vehicle 1 has a body 2 which defines a riding space R. The body 2 includes a roll bar 3, a door 4, an instrument panel 9, a vehicle body frame 20 and the like.

The roll bar 3 is located in an upper position of the body 2. The roll bar 3 is made of a steel tube, a steel plate or a synthetic resin and surrounds the riding space R.

The doors 4 are located in left and right end positions in the vehicle width direction. The doors 4 cover left and right lateral sides of the riding space R.

The instrument panel 9 is located in a front part of the body 2.

The vehicle body frame 20 is located in a lower part of the body 2.

A seat 5 is arranged in the riding space R. A steering wheel 8 and the instrument panel 9 are arranged in a front part of the riding space R and in front of the seat 5. In front of the instrument panel 9 there is arranged a front hood 10 which is continuous with a front part of the instrument panel 9. On left and right lateral sides of the front hood 10 there is arranged a front fender 11 which is continuous with left and right lateral portions of the front hood 10.

In a rear part of the riding space R and at the rear of the seat 5, there is formed a rear space RR serving as a luggage compartment or a rear riding space. In FIG. 1, two rear occupants ride side by side in the vehicle width direction in a seat (not shown) which is exposed externally by opening a floor plate 12 on which the luggage is placed.

Figure 2:
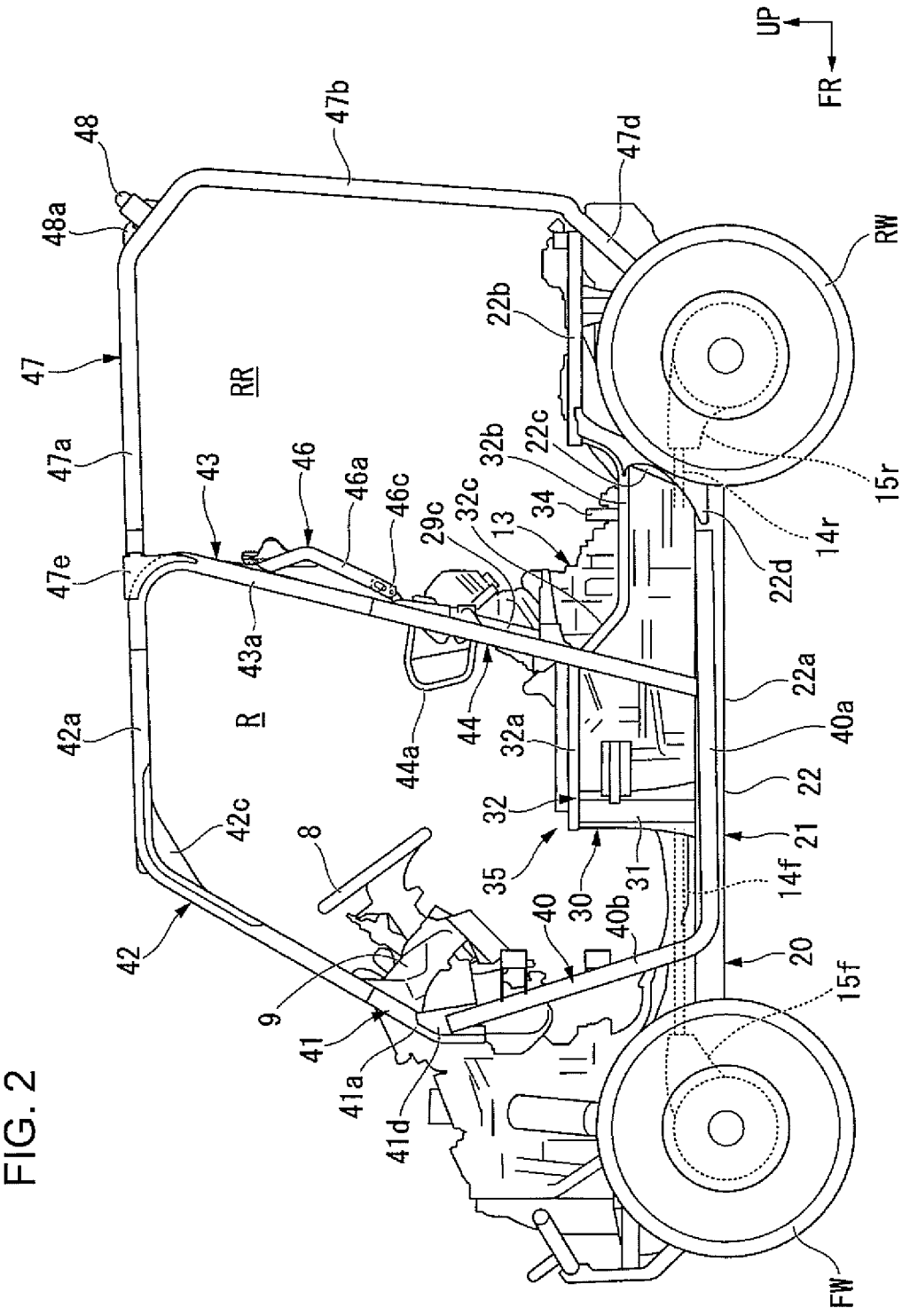
FIG. 2 is a left side view of the above vehicle.
Figure 3:
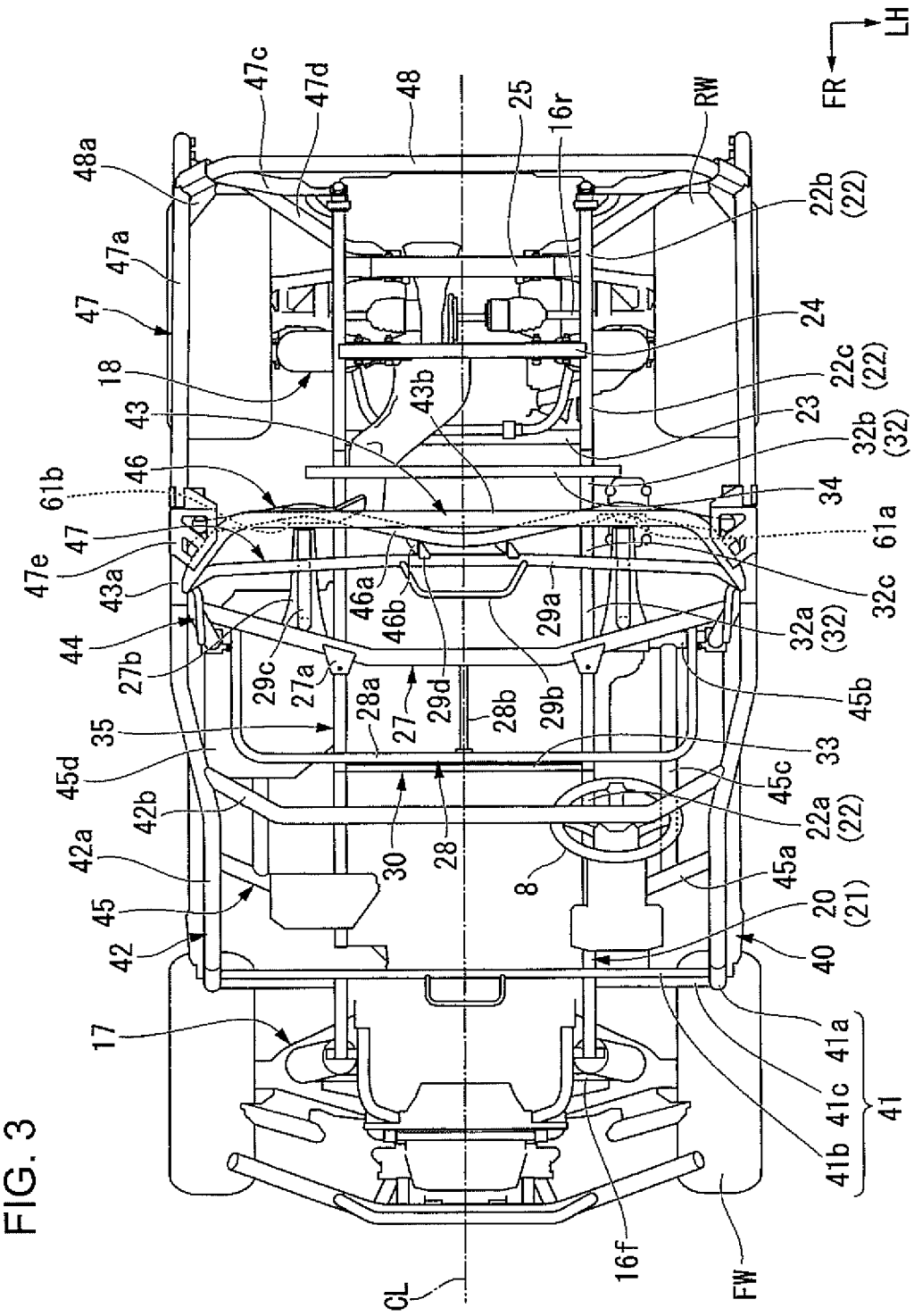
FIG. 3 is a top plan view of the above vehicle.

Referring to FIGS. 2 and 3, under and to the rear of the seat 5 there is arranged a drive unit 13 for travelling which is supported by the vehicle body frame 20. The drive unit 13 uses at least one of an internal combustion engine and an electric motor as a driving motor. The drive unit 13 is configured to output its driving force to a front propeller shaft 14f and a rear propeller shaft 14r, respectively.

The front side propeller shaft 14f is connected to a front differential gear mechanism 15f supported on a front part of the vehicle body frame 20. The rear propeller shaft 14r is connected to a rear differential gear mechanism 15r supported on a rear part of the vehicle body frame 20. A front drive shaft 16f (see FIG. 3) extends from the front differential gear mechanism 15f and is connected to the left and right front wheels FW. A rear drive shaft 16r (see FIG. 3) extends from the rear differential gear mechanism 15r and is connected to the left and right rear wheels RW.

The vehicle body frame 20 includes a frame main body 21, a sub-frame 30, a center cross frame 27 (see FIG. 3), a seat cushion frame 28 (see FIG. 3) and a seat back frame 29 (see FIG. 3). The vehicle body frame 20 is constituted by integrally connecting the sub-frame 30, the center cross frame 27, the seat cushion frame 28 and the seat back frame 29 each of which is separated, to front and rear middle portions of the frame main body 21 containing a pair of left and right side frames 22, by means of bolts, etc.

The frame main body 21 is formed by integrally joining various kinds of angular steel tubes to one another by welding and the like. The left and right side frames 22 extend in the forward and rearward direction at inward sides in the vehicle width direction located inwardly from a pair of left and right side roll bars 40 constituting the body 2. The left and right side frames 22 extend rectilinearly in a top plan view.

Each of the left and right side frames 22 includes a center section 22a, a rear section 22b and a step section 22c.

The center sections 22a are arranged in parallel with each other on the insides in the vehicle width direction of the left and right side roll bars 40 and extend in the forward and rearward direction.

The rear sections 22b are located to the rear of the center sections 22a. The rear sections 22b are offset upwardly from the center sections 22a in the lower part of the rear space RR and extend in the forward and rearward direction.

Each of the step sections 22c provides a connection between a middle portion in the forward and rearward direction of a rear part of the center section 22a and a front end of the rear section 22b.

A pair of left and right gussets 22d (see FIG. 2) is fixedly attached to the middle portions in the forward and rearward direction of the rear parts of the center sections 22a, the step sections 22c and the front ends of the rear sections 22b in such a way as to extend over them.

A rear lower cross frame 23 (see FIG. 3) which has a rectangular cross section and is lengthened in the leftward and rightward direction extends between front lower end portions of the step sections 22c of the left and right side frames 22. A first rear upper cross frame 24 has a rectangular cross section and is lengthened in the left and right direction extends between front end portions of the rear sections 22b of the left and right side frames 22. A second rear upper cross frame 25 having a rectangular cross section and lengthened in the leftward and rightward direction extends between rear end portions of the rear sections 22b of the left and right side frames 22. A rear end cross frame (not shown) which has a rectangular cross section and is lengthened in the leftward and rightward direction extends between rear end portions of the center sections 22a of the left and right side frames 22.

The sub-frame 30 is formed by integrally joining various kinds of angular steel tubes to one another by welding and the like. The sub-frame 30 includes a pair of left and right lower sub-side frames 31, a pair of left and right upper sub-side frames 32, a first upper cross frame 33 and a second upper cross frame 34.

Each of the left and right lower sub-side frames 31 extends substantially vertically in the upward direction from an intermediate portion in the forward and rearward direction of each front part of the center sections 22a of the left and right sub-frames 22.

Each of the left and right upper sub-side frames 32 includes a center section 32a, a rear section 32b and a step section 32c.

The center section 32a is arranged in a position overlapping with a middle portion in the forward and rearward direction of each of the center sections 22a of the left and right side frames 22 in a top plan view and extends in the forward and rearward direction.

The rear section 32b is arranged in a position overlapping with the middle portion in the forward and rearward direction of the rear part of each of the center sections 22a of the left and right side frames 22. The rear section 32b is offset downwardly from the center section 32a and extends in the forward and rearward direction. A rear end portion of the rear section 32b is connected to a middle portion in the upward and downward direction of each of the step sections 22c of the left and right side frames 22.

The step section 32c provides a connection between a rear end of the center section 32a and a front end of the rear section 32b.

The first upper cross frame 33 has an iron plate which has a U-shaped cross section and is lengthened in the leftward and rightward direction so as to extend between front end portions of the left and right upper sub-side frames 32.

The second upper cross frame 34 has a rectangular cross section and is lengthened in the leftward and rightward direction so as to extend between rear end portions of the left and right upper sub-side frames 32.

A box structure 35 as a whole is formed by the center sections 22a of the left and right side frames 22, the left and right lower sub-side frames 31, the left and right upper sub-side frames 32, the first upper cross frame 33 and the second upper cross frame 34. The drive unit 13 is configured to be installed on the inside of the box structure 35.

The center cross frame 27 is located above the left and right upper sub-side frames 32 and has a rectangular cross section. The center cross frame 27 is lengthened in the left and right direction so as to extend between middle portions in the upward and downward direction of left and right center side roll bars 44 to be referred to later. A middle portion in the vehicle width direction of the center cross frame 27 extends in a rectilinear fashion in the vehicle width direction in a top plan view. Outer side portions in the vehicle width direction of the center cross frame 27 are inclined in a top plan view in such a condition as to be located to the rear in the forward and rearward direction of the vehicle with approach toward the outer sides in the vehicle width direction thereof.

A pair of left and right gussets 27a (see FIG. 3) is fixedly attached to the outer portions in the vehicle width direction of the center cross frame 27 and the center sections 32a of the left and right upper sub-side frames 32 in such a way as to extend between them.

The seat cushion frame 28 has a main body section 28a and a connecting section 28b.

The main body section 28a is located above the left and right upper sub-side frames 32 and has a rectangular cross section. The main body section 28a extends in the leftward and rightward direction so as to connect left and right outer side portions in the vehicle width direction of the center cross frame 27. The main body section 28a is of U-shape in a top plan view.

The connecting section 28b provides a connection between a middle portion in the vehicle width direction of the main body section 28a and a middle portion in the vehicle width direction of the center cross frame 27. The connecting section 28b extends rectilinearly in the forward and rearward direction of the vehicle in a top plan view.

The seat back frame 29 includes a cross section 29a, a support section 29b, a pair of left and right connecting sections 29c, and a pair of left and right joining sections 29d.

The cross section 29a has a rectangular cross section and is lengthened in the leftward and rightward direction so as to extend between middle portions in the upward and downward direction of the left and right center side roll bars 44 to be referred to later. A middle portion in the vehicle width direction of the cross section 29a is adjacent to a middle portion in the vehicle width direction of a cross section 46a of a center cross roll bar 46 to be referred to below.

The support section 29b is of U-shape which projects forwardly and downwardly from the middle portion in the vehicle width direction of the cross section 29a.

Each of the left and right connecting sections 29c has a rectangular cross section and is lengthened in the upward and downward direction so as to extend between the cross section 29a and the outer side portion in the vehicle width direction of the center cross frame 27.

A pair of left and right gussets 27b (see FIG. 3) is fixedly attached to lower end portions of the left and right connecting sections 29c and the outer side portions in the vehicle width direction of the center cross frame 27 in such a way as to extend between them.

The left and right joining sections 29d project upwardly from the middle portion in the vehicle width direction of the cross section 29a toward the cross section 46a of the center cross roll bar 46 to be referred to later.

The left and right front wheels FW are suspended through an independent suspension type (double wishbone type) front suspension 17 from the front part of the vehicle body frame 20. The left and right rear wheels RW are suspended through an independent suspension type (double wishbone type) rear suspension 18 from the rear part of the vehicle body frame 20.

The roll bar 3 is formed by integrally joining various kinds of circular steel tubes by welding and the like. The roll bar 3 includes the pair of left and right side roll bars 40, a front top roll bar 41, a front upper roll bar 42, a center upper roll bar 43, the pair of left and right center side roll bars 44, a lower roll bar 45, the center cross roll bar 46, a pair of left and right rear side roll bars 47, and a rear cross roll bar 48.

The left and right side roll bars 40 extend rectilinearly in the forward and rearward direction of the vehicle in a top plan view. The left and right side roll bars 40 include a pair of left and right lower sections 40a and a pair of left and right front sections 40b.

The left and right lower sections 40a are arranged under the left and right doors 4 and located in a position overlapping with the middle portions in the forward and rearward direction of the center sections 22a of the left and right side frames 22 in a side view in such a way as to extend in the forward and rearward direction.

The left and right front sections 40b are connected to front ends of the left and right lower sections 40a and inclined in a side view in such a condition as to be located forwardly in the forward and rearward direction of the vehicle with approach toward the upper sides thereof.

The front top roll bar 41 includes a pair of left and right top side sections 41a, an upper cross section 41b and a lower cross section 41c. The left and right top side sections 41a provide a connection between each upper end portion of the front sections 40b of the left and right side roll bars 40 and each lower end portion of front parts of left and right upper side sections 42a of the front upper roll bar 42. Lower portions of the left and right top side sections 41a extend substantially vertically in the upward and downward direction in a side view. Upper portions of the left and right top side sections 41a are inclined in a side view in such a condition as to be located rearwardly in the forward and rearward direction of the vehicle with approach toward the upper sides thereof.

A pair of left and right gussets 41d (see FIG. 2) is fixedly attached in such a way as to extend between lower end portions of the left and right top side sections 41a and upper end portions of front sections 40b of the left and right side roll bars 40.

The upper cross section 41b has a circular cross section and is lengthened in the leftward and rightward direction so as to extend between upper end portions of the left and right top side sections 41a.

The lower cross section 41c has a circular cross section and is lengthened in the leftward and rightward direction so as to extend between lower end portions of the left and right top side sections 41a.

The front upper roll bar 42 includes a pair of left and right upper side sections 42a and a cross section 42b. The left and right upper side sections 42a are arranged in left and right lateral positions in the vehicle width direction of the riding space R. Front portions of the left and right upper side sections 42a are inclined in a side view in such a condition as to be located forwardly in the forward and rearward direction of the vehicle with approach toward the lower sides thereof. Rear portions of the left and right upper side sections 42a are connected to rear ends of the front portions of the left and right upper side sections 42a and extend substantially horizontally in the forward and rearward direction in a side view.

A pair of left and right gussets 42c (see FIG. 2) is fixedly attached in such a way as to extend between the rear ends of the front portions of the left and right upper side sections 42a and the front ends of the rear portions of the left and right upper side sections 42a.

The left and right upper side sections 42a, in a top plan view, start from the connecting portions with the left and right top side sections 41a and extend rectilinearly in the forward and rearward direction of the vehicle. Then, those are bent outwardly in the vehicle width direction from the near sides of connecting portions with the cross section 42b and inclined outwardly to the rear. Thereafter, the left and right upper side sections 42a extend rectilinearly in the forward and rearward direction of the vehicle at a location in the vicinity of connecting portions with a cross section 43b of the center upper roll bar 43.

The cross section 42b has a circular cross section and is lengthened in the leftward and rightward direction so as to extend between middle portions in the forward and rearward direction of the left and right upper side sections 42a. A middle portion in the vehicle width direction of the cross section 42b extends substantially horizontally in the vehicle width direction in a top plan view. Left and right outward portions in the vehicle width direction of the cross section 42b are inclined in a top plan view in such a condition as to be located rearwardly in the forward and rearward direction of the vehicle with approach toward the outer sides in the vehicle width direction thereof.

The center upper roll bar 43 includes a pair of left and right center side sections 43a and a cross section 43b. The left and right side center sections 43a are formed in an L-shape in a side view and extend in the upward and downward direction. Front ends of upper portions of the left and right center side sections 43a are connected to rear ends of the rear portions of the left and right upper side sections 42a. Lower portions of the left and right center side sections 43a are inclined in a side view in such a condition as to be located forwardly in the forward and rearward direction of the vehicle as the lower end portions thereof approach the lower sides thereof, and extend rectilinearly.

The cross section 43b has a circular cross section and is lengthened in the leftward and rightward direction so as to extend between front parts of the upper portions of the left and right center side sections 43a. A middle portion in the vehicle width direction of the cross section 43b extends rectilinearly in the vehicle width direction in a top plan view. Left and right outward portions in the vehicle width direction of the cross section 43b are inclined in a top plan view in such a condition as to be located forwardly in the forward and rearward direction of the vehicle with approach toward the outer sides in the vehicle width direction thereof.

The left and right center side roll bars 44 are connected at upper ends thereof to lower ends of the left and right center side sections 43a of the center upper roll bar 43 and connected at lower ends thereof to left and right end portions of a cross section 45b of the lower roll bar 45. The left and right center side roll bars 44 are inclined in a side view in such a condition as to be located forwardly in the forward and downward direction of the vehicle with approach toward the lower sides thereof, and extend rectilinearly in a continuous relationship with the left and right center side sections 43a. In upper areas of the left and right center side roll bars 44, brackets 44a (see FIG. 2) for supporting the left and right doors 4 (see FIG. 1) are provided in a forwardly projecting fashion.

The lower roll bar 45 includes a pair of left and right support sections 45a, the cross section 45b and a pair of left and right connecting sections 45c. The left and right support sections 45a are of circular cross section and are lengthened in the leftward and rightward direction so as to extend between the left and right lower sections 40a of the left and right side roll bars 40 and the front portions of center sections 22a of the left and right side frames 22. Left and right end portions in the vehicle width direction of the left and right support sections 45a are inclined in a top plan view in such a condition as to be located rearwardly in the forward and rearward direction of the vehicle with approach toward the outer sides in the vehicle width direction thereof.

A pair of left and right gussets 22e (see FIG. 4) is fixedly attached in such a way as to extend between inner end portions in the vehicle width direction of the left and right support sections 45a and the front portions of the center sections 22a of the left and right side frames 22.

The cross section 45b is circular in cross section and lengthened in the leftward and rightward direction so as to extend between rear portions of the left and right lower sections 40a of the left and right side roll bars 40. The cross section 45b extends rectilinearly in the vehicle width direction. A middle portion in the vehicle width direction of the cross section 45b is integrally connected to the frame main body 21 of the vehicle body frame 20 by means of bolts and the like.

The left and right connecting sections 45c are circular in cross section and lengthened in the forward and rearward direction so as to extend between the left and right support sections 45a and outer end portions in the vehicle width direction of the cross section 45b. The left and right connecting sections 45c extend rectilinearly in the forward and rearward direction of the vehicle.

A gusset 45d (see FIG. 3) is fixedly attached in such a way as to extend between a right end portion of the cross section 45b and a rear portion of the right connecting section 45c.

The center cross roll bar 46 includes a cross section 46a and a pair of left and right connecting sections 46b. The cross section 46a is circular in cross section and lengthened in the leftward and rightward direction so as to extend between upper and lower middle portions of the left and right center side sections 43a of the center upper roll bar 43. A middle portion in the vehicle width direction of the cross section 46a is of downwardly projecting curved shape.

In the middle in the vehicle width direction of a left portion in the vehicle width direction of the cross section 46a there is provided in an upwardly projecting fashion a first bracket 61a which supports a headrest (see FIG. 1) for a driver Dr. In the middle in the vehicle width direction of a right portion in the vehicle width direction of the cross section 46a there is provided in an upwardly projecting fashion a second bracket 61b which supports a headrest (see FIG. 1) for a second passenger Fp2.

A pair of left and right gussets 46c is fixedly attached in such a way as to extend between outward sides in the vehicle width direction of the cross section 46a and the middle portions in the upward and downward direction of the left and right center side sections 43a of the center upper roll bar 43.

The left and right connecting sections 46b are configured to project downwardly from the middle portion in the vehicle width direction of the cross section 46a towards the cross section 29a of the seat back frame 29. The left and right connecting sections 46b of the center cross roll bar 46 and the left and right connecting sections 29d of the seat back frame 29 are joined to each other, so that the cross section 46a of the center cross roll bar 46 and the middle portion in the vehicle width direction of the cross section 29a of the seat back frame 29 are connected.

The left and right rear side roll bars 47 are arranged in left and right portions in the vehicle width direction of a rear space RR. The left and right rear side roll bars 47 include a pair of left and right upper sections 47a, a pair of left and right rear sections 47b, a pair of left and right lower sections 47c, and a pair of left and right rear end sections 47d.

The left and right upper sections 47a are connected to the left and right center side sections 43a of the center upper roll bar 43 by means of bolts and the like, and extend rectilinearly in the forward and rearward direction of the vehicle in a top plan view.

A pair of left and right gussets 47e is fixedly attached in such a way as to extend between front end portions of the left and right upper sections 47a and the left and right center side sections 43a of the center upper roll bar 43.

The left and right rear sections 47b are connected to rear ends of the left and right upper sections 47a and moderately inclined in a side view in such a condition as to be located forwardly in the forward and rearward direction of the vehicle with approach toward the lower sides thereof.

The left and right lower sections 47 are connected to lower ends of the left and right rear sections 47b and extend inwardly in the vehicle width direction.

The left and right rear end sections 47d are connected to middle portions in the vehicle width direction of the left and right lower sections 47c and inclined in a top plan view in such a condition as to be located inwardly in the vehicle width direction with approach toward the forward sides thereof.

The rear cross roll bar 48 has a circular cross section and is lengthened in the leftward and rightward direction so as to extend between bent portions (connecting portions between the left and right upper sections 47a and the left and right rear sections 47b) of the left and right rear side roll bars 47. A pair of left and right gussets 48a is fixedly attached in such a way as to extend between outer end portions in the vehicle width direction of the rear cross roll bar 48 and the bent portions of the left and right rear side roll bars 47.

Figure 4:
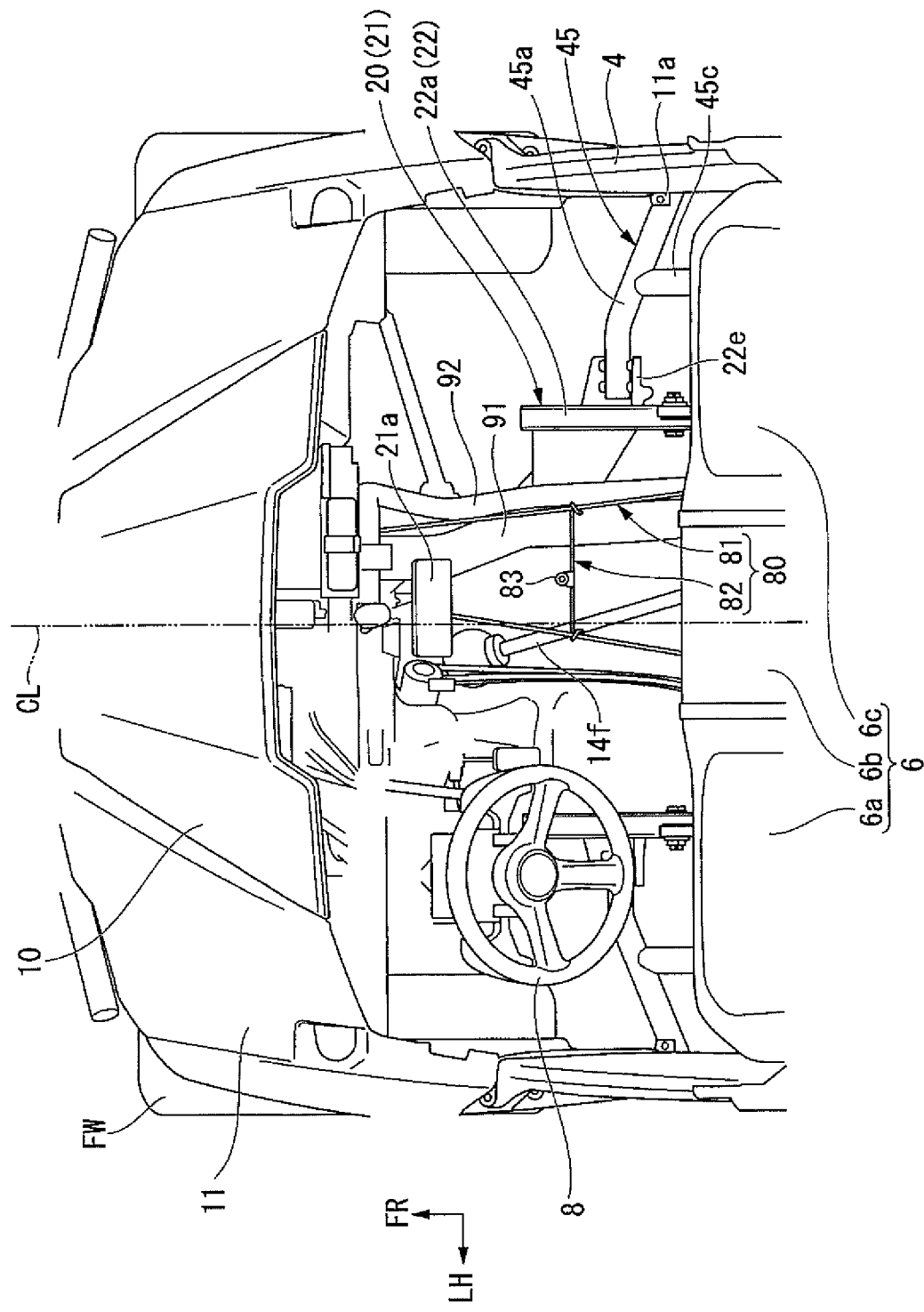
FIG. 4 is a perspective view (perspective view near a top plan view) of a floor support structure of the above vehicle with a floor removed.

Referring to FIGS. 1 and 4, the seat 5 includes a seat cushion 6 and a seat back (not shown).

The seat cushion 6 has a plurality of (three in this embodiment, for example) seat bodies (a first seat body 6a, a second seat body 6b and a third seat body 6c) arranged side by side in the vehicle width direction. The first seat body 6a is the one for the driver Dr (see FIG. 1) and is located on the left side in the vehicle width direction. The second seat body 6b is the one for the first passenger Fp1 (see FIG. 1) and is located in the middle in the vehicle width direction. The third seat body 6c is the one for the second passenger Fp2 (see FIG. 1) and is located on the right side in the vehicle width direction.

In FIG. 4, a reference character 91 designates an intake pipe for introducing air into a combustion chamber of an internal combustion engine. A reference character 92 designates a wire harness to be connected to various kinds of electric components.

Figure 7:
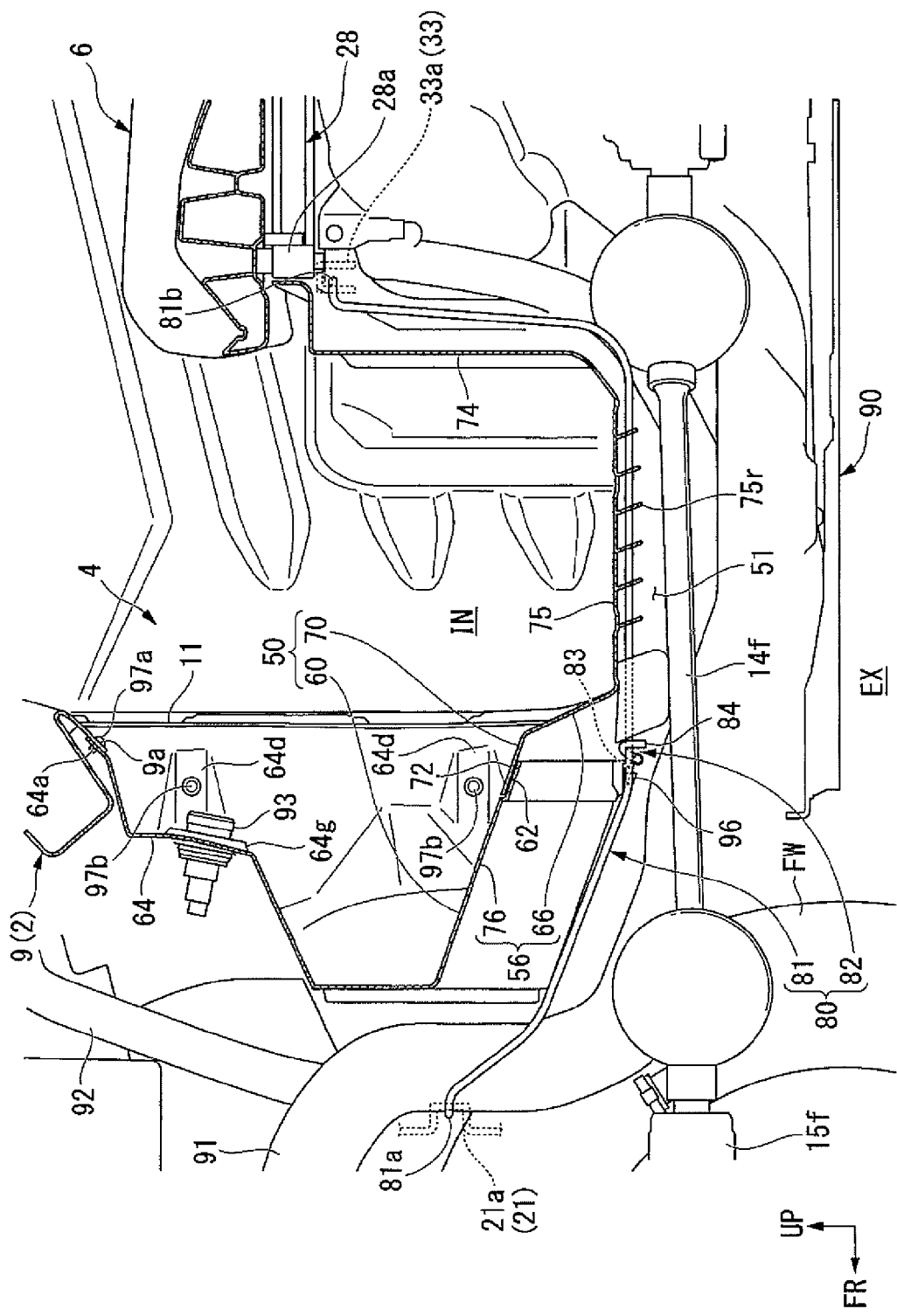
FIG. 7 is a cross sectional view taken along line I-I of FIG. 6.

As shown in FIG. 7, the seat cushion 6 is supported and fixed on the seat cushion frame 28 (see FIG. 3) constituting the vehicle body frame 20.

The seat back (not shown) is supported and fixed on the cross section 29a, the support section 29b and the pair of left and right connecting sections 29c of the seat back frame 29 (see FIG. 3).

Figure 6:
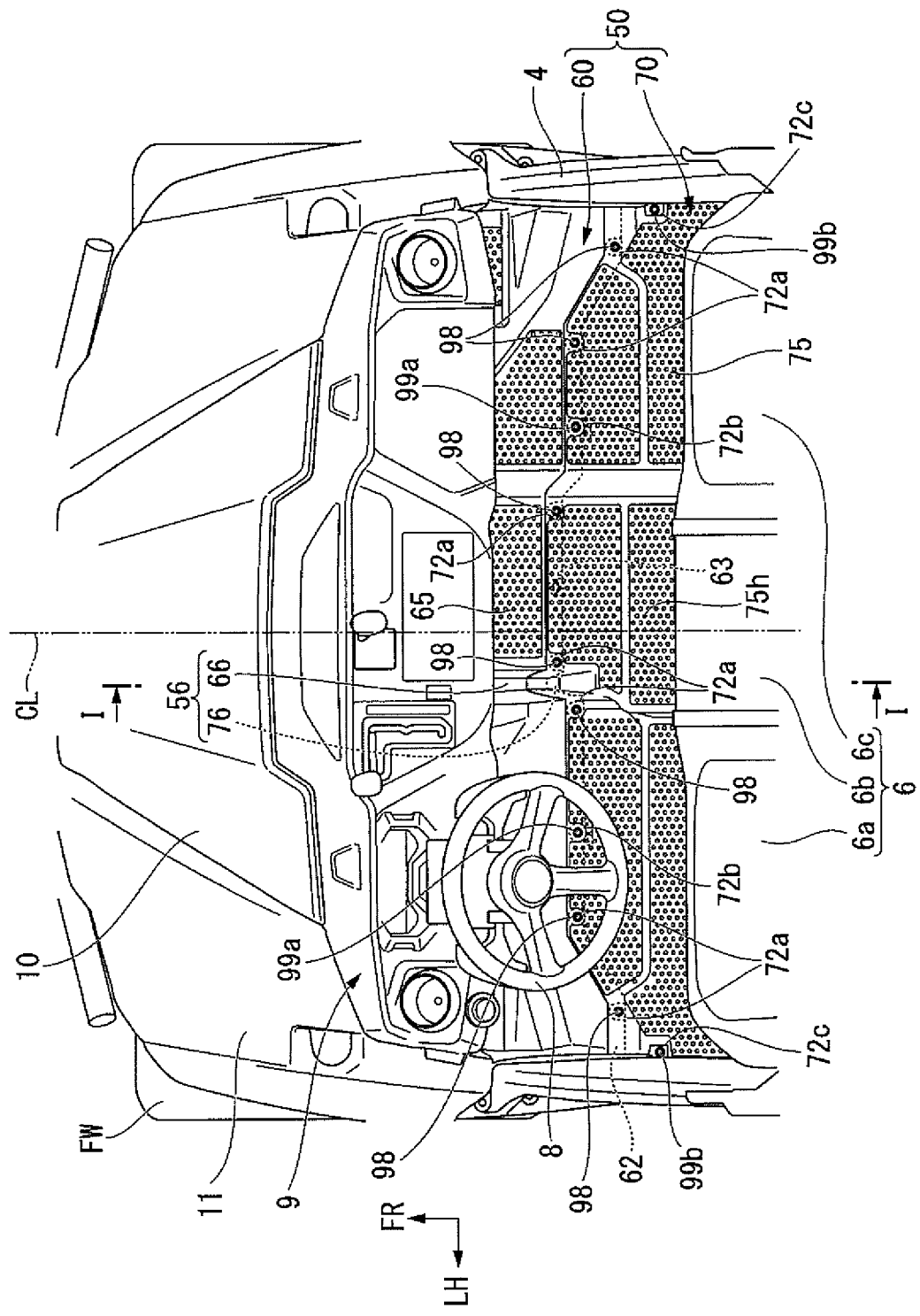
FIG. 6 is a perspective view (perspective view near a top plan view) of the floor support structure of the above vehicle with the floor attached.

As shown in FIG. 6, a front floor 50 (hereinafter, referred simply to as a "floor 50") extends in the vehicle width direction such that the occupants Dr, Fp1, Fp2 (the driver DR, the first passenger Fp1 and the second passenger Fp2 shown in FIG. 1) sitting side by side in the vehicle width direction are able to place their feet thereon, respectively. The floor 50 is formed with a plane surface part and separates a vehicle interior IN from a vehicle exterior EX.

Front and rear ends of the floor 5 in the forward and rearward direction of the vehicle and left and right ends in the vehicle width direction of the floor are carried by the body 2, respectively (see FIG. 1).

Referring to FIGS. 4 and 7, a floor stay 80 is arranged in the middle position in the vehicle width direction of the floor 50. The floor stay 80 makes contact with a lower surface in the middle in the vehicle width direction of the floor 50 so as to support the floor 50. The floor stay 80 includes a plurality of (two in this embodiment, for example) main stays 81 and a sub-stay 82.

Herein, the floor stay 80 does not necessarily make contact with the lower surface in the middle in the vehicle width direction of the floor 50. It may make contact with the lower surface around or in the vicinity of the middle in the vehicle width direction of the floor 50.

The plurality of main stays 81 are arranged in left-and-right pairs on either side of the center line CL in the left and right direction of the vehicle. The left and right main stays 81 are made of a wire rod of circular cross section. The left and right main stays 81, in FIG. 4, are inclined in such a condition as to be located inwardly in the vehicle width direction with approach toward the forward sides thereof and extend rectilinearly.

The left and right main stays 81 are configured to extend along the contour of the lower surface in or around the middle in the vehicle width direction of the floor 50.

To be specific, as shown in FIG. 8, the left and right main stays 81 extend from front end portions 81a thereof as starting points in the forward and rearward direction of the vehicle. Then, after they are bent diagonally rearwardly and downwardly and extend rectilinearly, they are more moderately bent diagonally rearwardly and downwardly than the forward sides thereof and extend rectilinearly. Then, after they are bent rearwardly and extend rectilinearly in the forward and rearward direction of the vehicle, they are bent diagonally rearwardly and upwardly and extend rectilinearly. Then, they are bent rearwardly and extend in the forward and rearward direction of the vehicle in a position higher than the height in the vertical direction of the front end portions 81a so as to reach rear end portions 81b thereof.

The front end portions 81a of the left and right main stays 81 engage sections (first sections) 21a in or around the middle in the vehicle width direction of the frame main body 21. The rear end portions 81b of the left and right main stays 81 engage sections (second sections) 33a in or around the middle in the vehicle width direction of the first upper cross frame 33.

Figure 11:
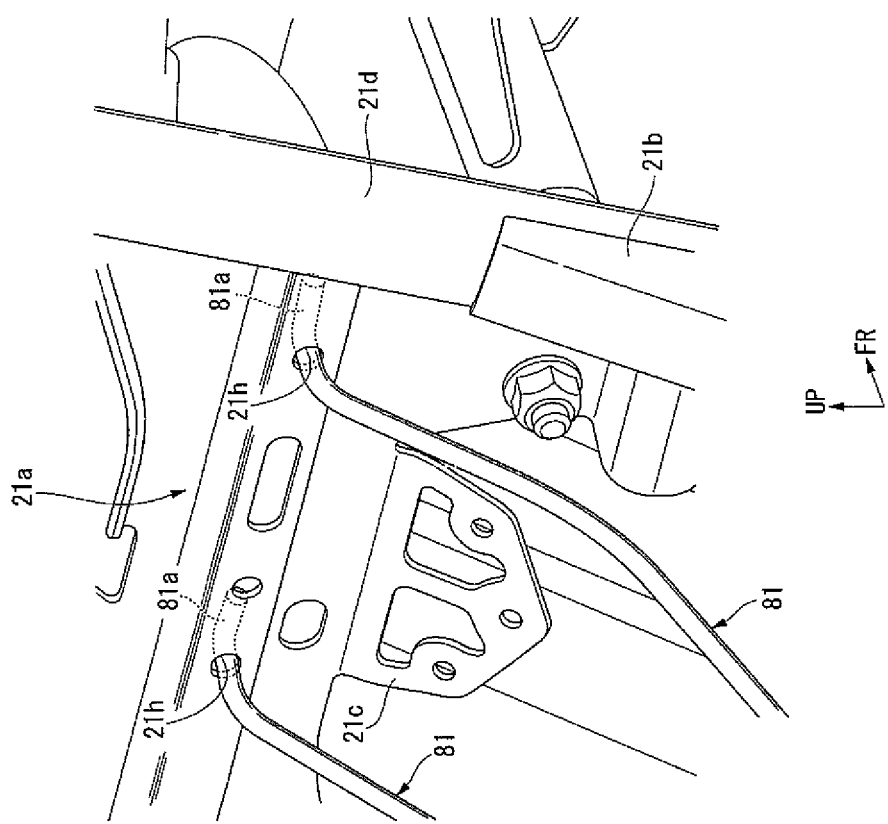
FIG. 11 is a perspective view, as seen from the rear at the upper right, of the floor support structure of the above vehicle in which front end portions of main stays are engaged.

Referring to FIGS. 3, 7 and 11, in front of the center sections 22a of the left and right side frames 22 there is provided a pair of left and right front side frames 21d (the left front side frame 21d is not shown in the drawing) which extends in the upward and downward direction in such a condition as to be inclined outwardly in the vehicle width direction with approach toward the upper side thereof. The left and right front side frames 21d extend upwardly so as to support the steering wheel 8 and the front suspension 17. Upper and lower ends of the left and right front side frames 21d are integrally joined to the vehicle body frame 20 (see FIG. 2) by means of welding and the like.

A front cross frame 21a as the first section of the frame main body 21 is made of iron plate formed in a hat-shaped cross section and lengthened in the left and right direction so as to extend between upper portions of the left and right front side frames 21d. Since the front cross frame 21a is of hat-shaped cross section, the strength and rigidity of the front cross frame 21a (the frame main body 21) can be increased. On either side of in the vehicle width direction of the front cross frame 21a, there is formed a pair of left and right extension sections 21b (the left extension section 21b is not shown in the drawing) which extends outwardly in the vehicle width direction. The left and right extension sections 21b are integrally joined to the left and right side frames 21d by means of welding and the like. In a lower part in the middle in the vehicle width direction of the front cross frame 21a there is formed a mounting portion 21c which extends diagonally rearwardly and downwardly. While not shown in the drawing, piping and the like may be mounted on the mounting portion 21c by clips and the like.

In the front cross frame 21a, a plurality of (four in FIG. 11, for example) through holes 21h which open in the forward and rearward direction thereof are formed at predetermined spaced intervals in the vehicle width direction. When the front end portions 81a of the left and right main stays 81 are inserted into the through holes 21h of the front cross frame 21a respectively, the front end portions 81a of the left and right main stays 81 engage the front cross frame 21a. Each of the front end portions 81a of the left and right main stays 81, in the state of engagement, is bent at approximately 90° to the right in the vehicle width direction so as to extend along an inner wall of the front cross frame 21a in a state of contacting the inner wall of the front cross frame 21a.

Figure 12:
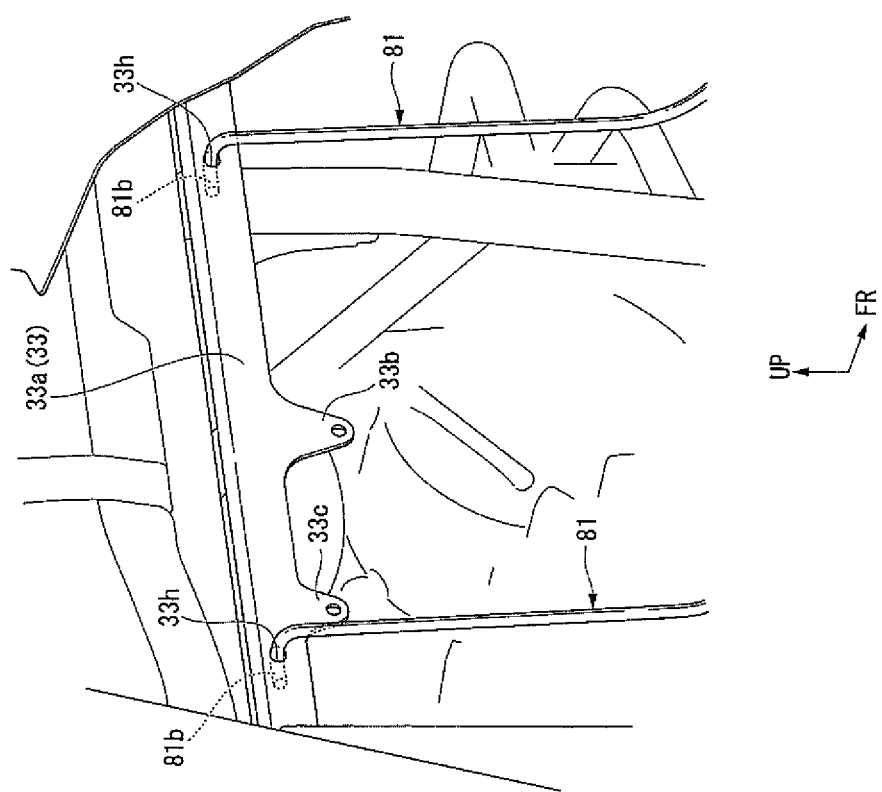
FIG. 12 is a perspective view, as seen from the front at the upper right, of the floor support structure of the above vehicle in which rear end portions of the main stays are engaged.

Referring to FIG. 12 together, a plurality of (two in FIG. 12, for example) downwardly extending mounting portions 33b, 33c are formed at predetermined spaced intervals in a lower part of the second section 33a of the first upper cross frame 33. While not shown in the drawing, piping and the like may be mounted on the mounting portions 33b, 33c by clips and the like.

In the second section 33a of the first upper cross frame 33, a plurality of (two in this embodiment, for example) through holes 33h which open in the forward and rearward direction are formed at predetermined spaced intervals in the vehicle width direction. When the rear end portions 81b of the left and right main stays 81 are inserted into the through holes 33h of the second section 33a of the first upper cross frame 33 respectively, the rear end portions 81b of the left and right main stays 81 engage the second section 33a of the first upper cross frame 33. Each of the rear end portions 81b of the left and right main stays 81, in the state of engagement, is bent at approximately 90° to the right in the vehicle width direction so as to extend along an inner wall of the second section 33a of the first upper cross frame 33 in a state of contacting the inner wall of the second section 33a.

The left and right main stays 81 extend between the section 21a in or around the middle in the vehicle width direction of the frame main body 21 and the section 33a in or around the middle in the vehicle width direction of the first upper cross frame 33 and bear a load from above on the floor 50.

The front and rear end portions 81a, 81b of the left and right main stays 81 each are bent at approximately 90° to the right in the vehicle width direction so as to extend on the inside of wall surfaces of the vehicle body frame 21 in a state of being inserted into the through holes 21h, 33h each of which is provided in the wall surfaces of the vehicle body frame 21.

It should be noted that the sections between which the left and right main stays 81 extend are not limited to this embodiment. It is sufficient if each of the left and right main stays 81 extends between the first section 21a which is located near the front end portion in the forward and rearward direction of the floor 50 of the body 2 and the second section 33a which is located near the rear end portion in the forward and rearward direction of the floor 50 of the body 2.

The sub-stay 82 intersects with the center line CL in the left and right direction of the vehicle body and extends rectilinearly leftward and rightward in the vehicle width direction. The sub-stay 82 is made of a wire rod of circular cross section. The sub-stay 82 extends between the left and right main stays 81 in the vehicle width direction so as to restrain the displacement in the vehicle width direction of the left and right main stays 81.

As shown in FIGS. 8(*a*) and (*b*), the sub-stay 82 is formed at left and right end portions thereof in the vehicle width direction with a plurality of coiled engaging portions 84 each of which is wound in a state of forming a space 1s equal to or greater than a diameter of each of the main stays 81. The engaging portion 84 is formed by turning approximately a revolution on a virtual line extending in the forward and rearward direction of the vehicle. An inner space 84a of the engaging portion 84 is circular as shown in FIG. 8(*b*). The engaging portions 84 located in the left and right end portions in the vehicle width direction of the sub-stay 82 are configured to engage the left and right main stays 81, respectively.

In FIGS. 8(*a*) and (*b*), as a matter of convenience, the middle portion in the vehicle width direction and one side part in the vehicle width direction of the sub-stay 82 are illustrated. The other side part in the vehicle width direction of the sub-stay 82 is of symmetrical configuration about the center in the vehicle width direction with the one side part in the vehicle width direction, and so is not shown in the drawing.

A single mounting member 83 is provided in the middle in the vehicle width direction of the sub-stay 82. A pair of through holes 83a is formed in upper and lower positions of the mounting member 83. The mounting member 83 is mounted in a revolvable fashion about an axis (axis extending along the vehicle width direction) in the middle in the vehicle width direction of the sub-stay 82.

Figure 5:
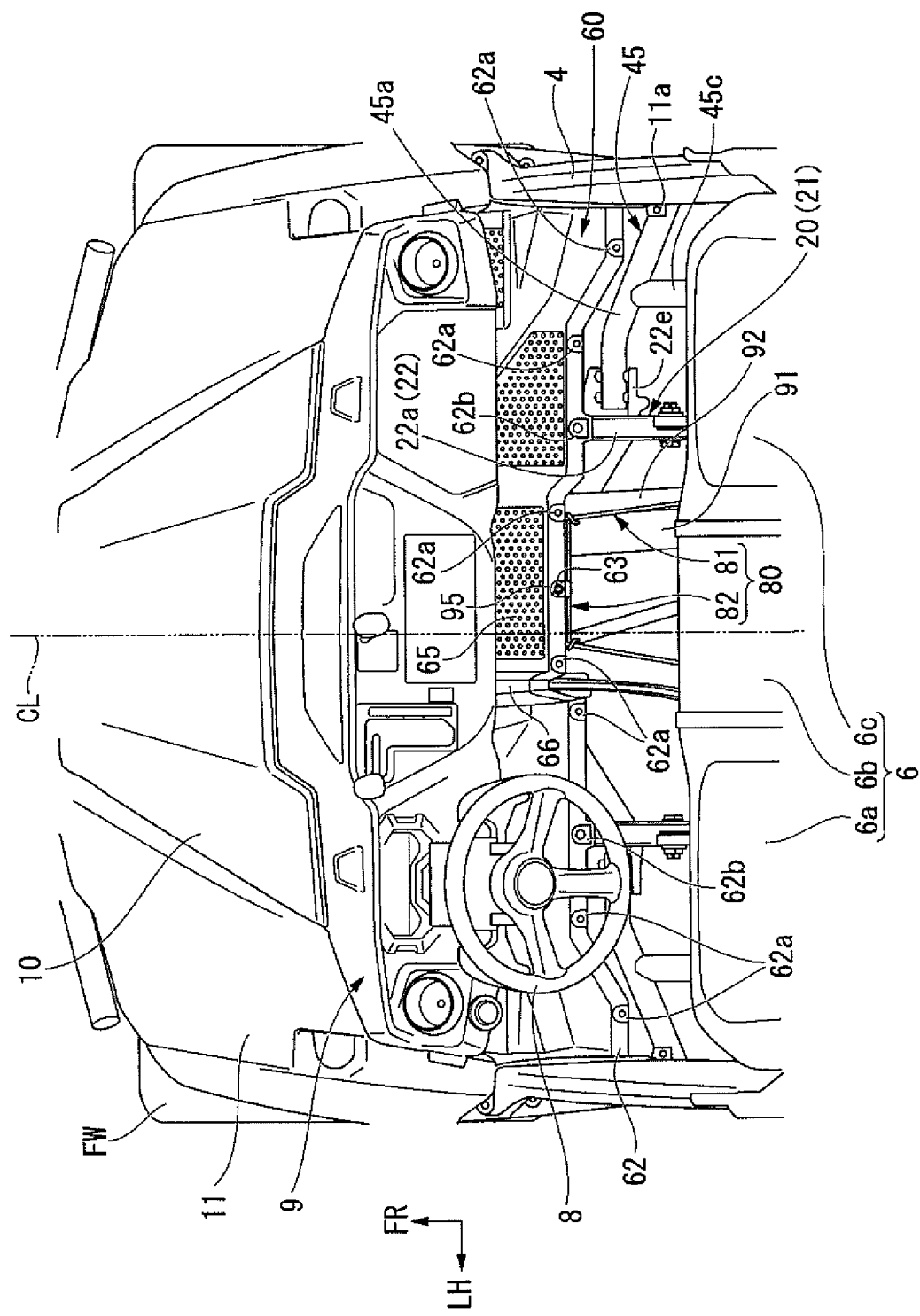
FIG. 5 is a perspective view (perspective view near a top plan view) of the floor support structure of the above vehicle with a second cover removed.

Referring to FIG. 7 together, the floor stay 80 is fastened to the floor 50 through the single mounting member 83 provided on the sub-stay 82. Referring further to FIG. 5, specifically, when nuts 96 are screwed and tightened down on bolts 95 passing through the through holes 83a of the mounting member 83 of the sub-stay 82, the floor stay 80 is fastened to and fixed on a fastening portion 63 located in the middle in the vehicle width direction of a divided section 62 of a first cover 60 to be referred to later.

Figure 9:
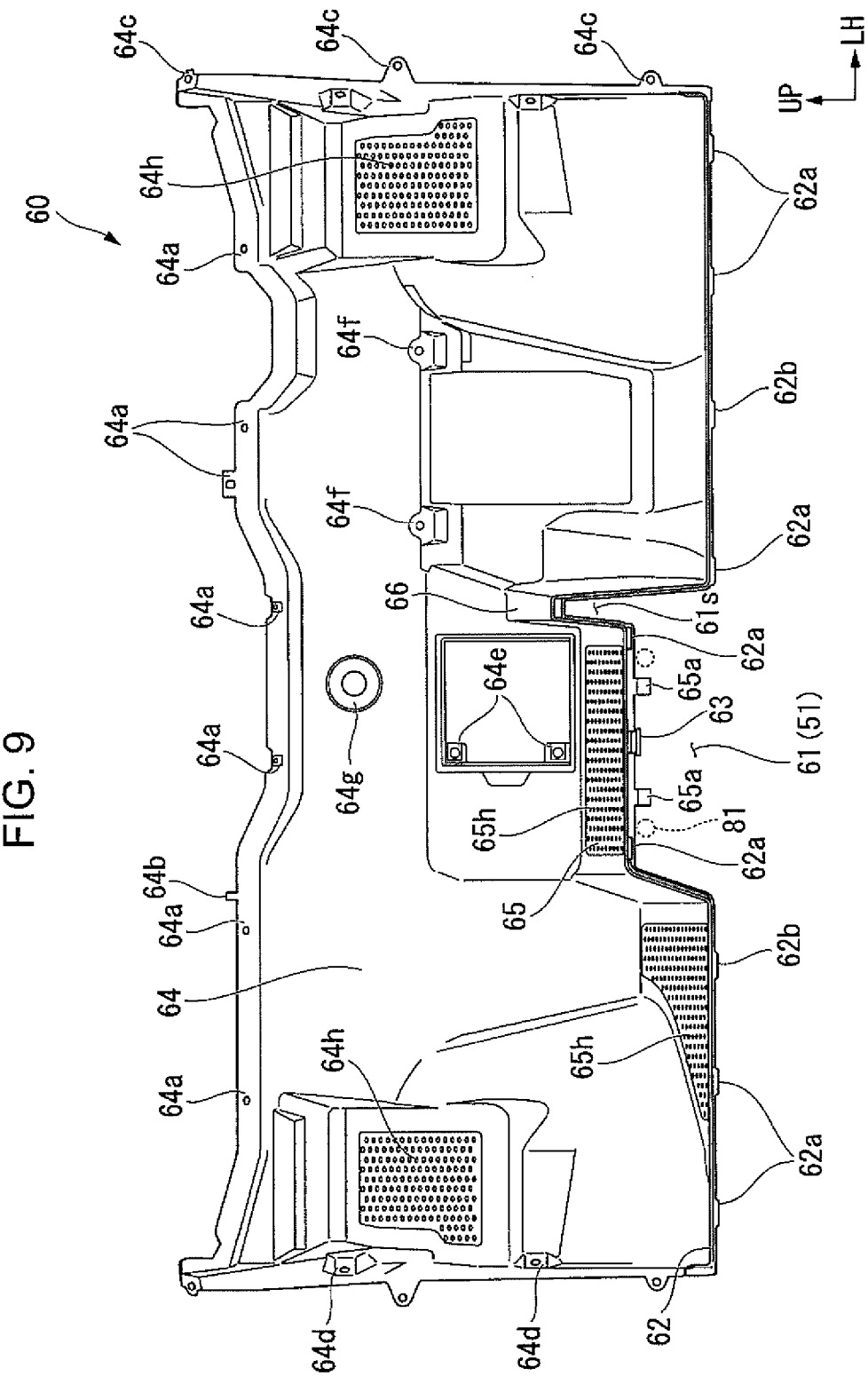
FIG. 9 is a front view of a second cover in the floor support structure of the above vehicle.
Figure 10:
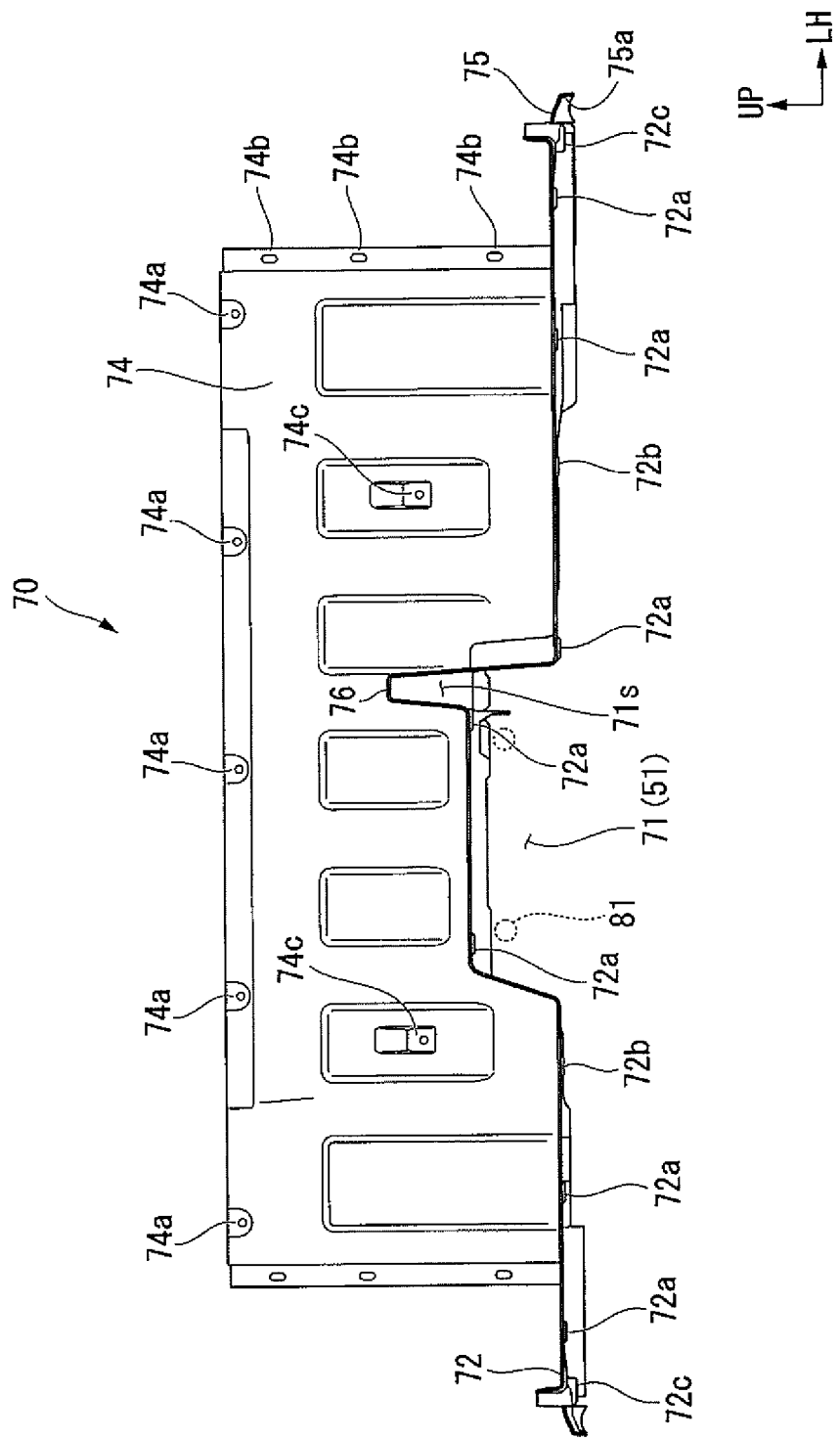
FIG. 10 is a front view of the second cover in the floor support structure of the above vehicle.

Referring to FIGS. 7, 9 and 10 at the same time, the floor 50 extends in the forward and rearward direction of the vehicle in or around the middle in the vehicle width direction and has an upwardly convexed tunnel section 51. The floor stay 80 is arranged in the tunnel section 51.

The tunnel section 51 is formed by a first tunnel section 61 and a second tunnel section 71 which communicate with each other. The first tunnel section 61 (see FIG. 9) extends in the forward and rearward direction of the vehicle, in or around the middle in the vehicle width direction of the first cover 60 and is convexed upwardly. The second tunnel section 71 (see FIG. 10) extends in the forward and rearward direction of the vehicle, in or around the middle in the vehicle width direction of the second cover 70 and is convexed upwardly.

As shown in FIG. 6, a partition section 56 for partitioning a footrest portion of the driver Dr from a footrest portion of the first passenger Fp1 is formed in the floor 50 in an upwardly projecting fashion. The partition section 56 is formed by a first partition section 66 and a second partition section 76 which communicate with each other.

The first partition section 66 (see FIG. 9) is located near the left side in the middle in the vehicle width direction of the first cover 60 and formed in an upwardly projecting fashion. Under the first partition section 66 there is formed a first partition space 61s which projects upwardly on the left upper side of the first tunnel section 61.

The second partition section 76 (see FIG. 10) is located near the left side in the middle in the vehicle width direction of the second cover 70 and formed in an upwardly projecting fashion. Under the second partition section 76 there is formed a second partition space 71s which projects upwardly on the left upper side of the second tunnel section 71.

As shown in FIG. 6, the floor 50 is divided into the first cover 60 on the front side and the second cover 70 on the rear side at an intermediate position in the forward and rearward direction of the vehicle. The first cover 60 and the second cover 70 overlap with each other at divided sections 62, 72 thereof located at the intermediate position in the forward and rearward direction of the vehicle.

Hereinafter, the divided section 62 of the first cover 60 will be referred to as "the first divided section 62", and the divided section 72 of the second cover 70 will be referred to as "the second divided section 72".

The first divided section 62 is located in a lower rear end part of the first cover 60. The second divided section 72 is located in a lower front end part of the second cover 70.

As shown in FIG. 5, in a condition where the second cover 70 is removed, the fastening portion 63 for fastening the sub-stay 82 is formed in the middle in the vehicle width direction of the first divided section 62.

Referring to FIGS. 7 and 9 at the same time, the first cover 60 includes the first divided section 62, a main body section 64 and a connecting section 65.

A middle portion in the upward and downward direction of the first cover 60 is formed in a curved shape which projects forwardly in the forward and rearward direction of the vehicle. Specifically, the first cover 60, in FIG. 7, extends diagonally forwardly and downwardly from an upper end portion of the main body section 64 thereof as a starting point. Then, it is bent diagonally forwardly and downwardly in a more moderate fashion than the rear side thereof and extends rectilinearly. Then, after it is bent downwardly and extends in a rearwardly projecting curved shape, it is bent diagonally forwardly and downwardly and extends rectilinearly. Then, it is bent downwardly and extends rectilinearly so as to reach a front end of the first partition section 66. Then, after it is bent diagonally downwardly to the rear and extends rectilinearly, it is bent downwardly to a degree of thickness in the upward and downward direction of the second divided section 72 of the second cover 70. Then, it is bent diagonally downwardly to the rear so as to reach a rear end of the first divided section 62.

As shown in FIGS. 5 and 9, the first divided section 62 extends left and right in the vehicle width direction in the lower rear end part of the first cover 60. In the first divided section 62, the single fastening portion 63, a plurality of (seven in this embodiment, for example) first fastening portions 62a and a plurality of (two in this embodiment, for example) second fastening portions 62b are formed at predetermined spaced intervals in the vehicle width direction. The first divided section 62 is fixed on the sub-stay 82, the second divided section 72 and the body 2. Through holes which open in the upward and downward direction are formed in each of the fastening portions 63, 62a and 62b.

As shown in FIG. 7, when the nuts 96 are screwed and tightened down on the bolts 95 (see FIG. 5) passing through the through hole of the fastening portion 63 of the first divided section 62 and the through holes 83a of the mounting member 83 of the sub-stay 82, the fastening portion 63 of the first divided section 62 is fastened to and fixed on the mounting portion 83 of the sub-stay 82.

As shown in FIG. 9, the main body section 64 occupies the most part (a middle part and an upper part in the upward and downward direction) of the first cover 60 and is of rectangular shape extending left and right in the vehicle width direction. In an upper end portion of the main body section 64, a plurality of (seven in this embodiment, for example) fastening portions 64a and a single position regulating portion 64b are formed at predetermined spaced intervals in the vehicle width direction. The upper end portion of the main body section 64 is fixed on a lower part of the instrument panel 9 (see FIG. 7). Through holes which open in the forward and rearward direction are formed in each of the fastening portions 64a. The position regulating portion 64b is configured to regulate left and right positions in the vehicle width direction of the upper end portion of the main body section 64 at the time when the upper end portion of the main body section 64 is fixed on the lower part of the instrument panel 9 (see FIG. 7). As shown in FIG. 7, when trim clips 97a are inserted into the through holes of each of the fastening portions 64a, the lower end portion of the main body section 64 is fixed on a mounting portion 9a located in the lower part of the instrument panel 9.

As shown in FIG. 9, in left and right end portions in the vehicle width direction of the main body section 64, a plurality of (six in total, three on the left side and three on the right side in this embodiment, for example) fastening portions 64c are formed at predetermined spaced intervals in the upward and downward direction. The left and right end portions in the vehicle width direction of the main body section 64 are fixed on rear end portions of the left and right front fenders 11 (see FIG. 7). Each of the fastening portions 64c has a through hole which opens in the forward and rearward direction. When trim clips (not shown) are inserted into the through holes of each of the fastening portions 64c, the left and right end portions in the vehicle width direction of the main body section 64 are fixed on the rear end portions of the left and right front fenders 11 (see FIG. 7).

In left and right lateral portions in the vehicle width direction of the main body section 64, a plurality of (four in total, two on the left side and two on the right side in this embodiment, for example) fastening portions 64d are formed at predetermined spaced intervals in the upward and downward direction. The left and right lateral portions in the vehicle width direction of the main body section 64 are fixed on rear portions of the left and right front fenders 11 (see FIG. 7). In each of the fastening portions 64d there are formed through holes which open in the left and right direction. As shown in FIG. 7, when trim clips 97b each are inserted into the through holes of the fastening portions 64d, the left and right lateral portions in the vehicle width direction of the main body section 64 is fixed on the rear portions of the left and right front fenders 11.

As shown in FIG. 9, in a middle portion in the upward and downward direction and in the left and d right direction of the main body section 64, a plurality of (two in this embodiment, for example) fastening portions 64e are formed at predetermined spaced intervals in the upward and downward direction. In the fastening portions 64e there are formed through holes each of which opens in the forward and rearward direction.

In the middle in the upward and downward direction of a left lateral part of the main body section 64, a plurality of (two in this embodiment, for example) fastening portions 64f are formed at predetermined spaced intervals in the vehicle width direction. Each of the fastening portions 64f has a through hole which opens in the forward and rearward direction thereof.

Predetermined functional components are attached through the through holes to the fastening portions 64e, 64f, respectively.

A single fastening portion 64g is formed in the middle in the vehicle width direction of an upper part of the main body section 64. The fastening portion 64g has a through hole which opens in the forward and rearward direction thereof. As shown in FIG. 7, a cigar socket 93 is attached through the through hole to the fastening portion 64g.

As shown in FIG. 9, a pair of left and right slip preventing sections 64h is formed in the middle in the upward and downward direction of left and right lateral parts in the vehicle width direction of the main body section 64.

The connecting section 65 is located in a lower part of the first cover 60 and extends left and right in the vehicle width direction so as to connect the main body section 64 and the first divided section 62. In the connecting section 65, a plurality of (two in this embodiment, for example) slip preventing sections 65h are formed at predetermined spaced intervals in the vehicle width direction.

In a lower surface of the connecting section 65 facing the first tunnel section 61, there is formed a pair of left and right downwardly projecting convex portions 65a. The left and right main stays 81 (shown by a dashed line) are disposed externally in the vehicle width direction of the left and right convex portions 65a.

Referring to FIGS. 7 and 10 at the same time, the second cover 70 includes the second divided section 72, a rear wall section 74 and a connecting section 75.

A middle portion in the forward and rearward direction of the second cover 70 has a curved shape which projects downwardly in the forward and rearward direction of the vehicle. Specifically, in FIG. 7, the second cover 70 extends downwardly from an upper end portion of the rear wall section 74 as a starting point. Then, after it is bent forwardly and extends rectilinearly, it is bent downwardly and extends rectilinearly. Then, after it is bent diagonally forwardly and downwardly and extends to a rear end of the connecting section 75, it is bent forwardly and extends rectilinearly so as to reach a rear end of the second partition section 76. Then, after it is bent diagonally forwardly and upwardly and extends rectilinearly, it is bent diagonally forwardly and upwardly in a more moderate fashion than the rear side and extends to a front end of the second divided section 72.

The second divided section 72 extends left and right in the vehicle width direction in a lower front end portion of the second cover 70. As shown in FIGS. 6 and 10, in the second divided section 72, a plurality of (seven in this embodiment, for example) first fastening portions 72a, a plurality of (two in this embodiment, for example) second fastening portions 72b, and a plurality of (two in this embodiment, for example) third fastening portions 72c are formed at predetermined spaced intervals in the vehicle width direction. The second divided section 72 is fixed on the first divided section 62 and the body 2. The fastening portions 72a, 72b, 72c each are formed with through holes which open in the upward and downward direction.

Referring further to FIG. 5, when trim clips 98 are inserted into the through holes of the first fastening portions 72a of the second divided section 72 and the through holes of the first fastening portions 62a of the first divided section 62, the first fastening portions 72a of the second divided section 72 are fixed on the first fastening portions 62a of the first divided section 62.

Further, when nuts (not shown) are screwed and tightened down on bolts 99a passing through the through holes of the second fastening portions 72b of the second divided section 72 and the through holes of the second fastening portions 62b of the first divided section 62, both of the second fastening portions 72b of the second divided section 72 and the second fastening portions 62b of the first divided section 62 are fastened to and fixed on mounting portions (not shown) located in the front part of the center section 22a of each of the left and right side frames 22.

In addition, when nuts (not shown) are screwed and tightened down on bolts 99b passing through the through holes of the third fastening portions 72c of the second divided section 72, the third fastening portions 72c of the second divided section 72 are fastened to and fixed on mounting portions 11a located in the rear lower part of each of left and right front fenders 11.

As shown in FIG. 10, the rear wall section 74 occupies the most part (a middle part and an upper part in the upward and downward direction) of the second cover 70 and has a rectangular shape extending left and right in the vehicle width direction. In an upper end portion of the rear wall section 74, a plurality of (five in this embodiment, for example) fastening portions 74a are formed at predetermined spaced intervals in the vehicle width direction. The upper end portion of the rear wall section 74 is fixed on the main body section 28a (see FIG. 7) of the seat cushion frame 28. The fastening portions 74a each are formed with through holes which open in the forward and rearward direction thereof. When trim clips (not shown) are inserted into the through holes of the fastening portions 74a respectively, the upper end portion of the rear wall section 74 is fixed on the main body section 28a (see FIG. 7) of the seat cushion frame 28.

In left and right end portions in the vehicle width direction of the rear wall section 74, a plurality of (six in total, three on the left side and three on the right side in this embodiment, for example) fastening portions 74b are formed at predetermined spaced intervals in the upward and downward direction. The left and right end portions in the vehicle width direction of the rear wall section 74 are fixed on an upwardly and downwardly extending part (not shown) connecting the main body section 28a (see FIG. 3) of the seat cushion frame 28 and the left and right connecting sections 45c (see FIG. 3) of the lower roll bar 45. The fastening portions 74b each are formed with through holes which open in the forward and rearward direction thereof. When trim clips (not shown) are inserted into the through holes of the fastening portions 74b respectively, the left and right end portions in the vehicle width direction of the rear wall section 74 are fixed on the upwardly and downwardly extending part.

A pair of left and right fastening portions 74c is formed in a middle portion in the upward and downward direction of the rear wall section 74. The middle portion in the upward and downward direction of the rear wall section 74 is fixed on the left and right lower sub-side frames 31 (see FIG. 2). The fastening portions 74c each are formed with through holes which open in the forward and rearward direction. When trim clips (not shown) are inserted into the though holes of the fastening portions 74c respectively, the middle portion in the upward and downward direction of the rear wall section 74 is fixed on the left and right lower sub-side frames 31.

As shown in FIG. 7, the connecting section 75 is located in a lower part of the middle in the forward and rearward direction of the second cover 70 and extends left and right in the vehicle width direction so as to connect the rear wall section 74 and the second divided section 72. As shown in FIG. 6, in the connecting section 75, a plurality of (six in this embodiment, for example) slip preventing sections 75h are formed at predetermined spaced intervals in the vehicle width direction.

As shown in FIG. 10, a pair of left and right engaging portions 75a is formed in left and right end portions in the vehicle width direction of the connecting section 75. The left and right end portions of the connecting section 75 are supported on the left and right lower sections 40a (see FIG. 2) of the left and right roll bars 40. The engaging portion 75a is of circular arc shape having a space equal to or greater than a diameter of each of the left and right lower sections 40a. When the left and right engaging portions 75a of the connecting section 75 engage the left and right lower sections 40a, the left and right end portions in the vehicle width direction of the connecting section 75 are supported on the left and right lower sections 40a (see FIG. 2).

As shown in FIG. 7, on a lower surface of the connecting section 75, a plurality of (six in this embodiment, for example) ribs 75r are formed in predetermined spaced intervals in the forward and rearward direction of the vehicle. The ribs 75r each extend diagonally rearwardly and downwardly from the lower surface of the connecting section 75. In FIG. 7, a reference character 90 designates an under cover.

An example of a mounting method of the floor 50 will be explained hereunder. First, the sub-stay 82 is fitted between the left and right main stays 81 so as to be assembled into an H-shape in mutually freely movable fashion.

Next, the floor stay 80 (see FIG. 4) is engaged in the body 2 (see FIG. 2). Specifically, as shown in FIG. 7, the front end portions 81a of the left and right main stays 81 engage the section 21a (the first section) in or around the middle in the vehicle width direction of the frame main body 21. A the same time, the rear end portions 81b of the left and right main stays 81 engage the section 33a (the second section) in or around the middle in the vehicle width direction of the first upper cross frame 33, so that the left and right main stays 81 extend between the first section 21a and the second section 33a. When the left and right main stays 81 are engaged in the body 2, the sub-stay 82 is held to be movable only in the forward and rearward direction.

Next, as shown in FIGS. 5, 7 and 9, the first cover 60 is fixed on the body 2.

Specifically, as shown in FIG. 7, the upper end portion of the main body section 64 of the first cover 60 is fixed on the mounting portion 9a of the lower part of the instrument panel 9 by inserting the trim clips 97a into the through holes of the fastening portions 64a of the main body section 64 respectively.

Moreover, the left and right end portions in the vehicle width direction of the main body section 64 of the first cover 60 are fixed on the rear end portions of the left and right front fenders 11 by inserting the trim clips (not shown) into the through holes of the fastening portions 64c of the main body section 64 respectively.

Further, the left and right lateral portions in the vehicle width direction of the main body section 64 of the first cover 60 are fixed on the rear end portions of the left and right front fenders 11 by inserting the trim clips 97b into the through holes of the fastening portions 64d of the main body section 64 respectively.

Next, as shown in FIGS. 5 and 7, the first cover 60 is fixed on the floor stay 80.

Specifically, the fastening portion 63 of the first divided section 62 of the first cover 60 is fastened to and fixed on the mounting portion 83 of the sub-stay 82 in such a manner that the nuts 96 (see FIG. 7) are screwed and tightened down on the bolts 95 (see FIG. 5) passing through the through holes of the first divided section 62 and the through holes 83a of the mounting member 83 of the sub-stay 82.

Next, as shown in FIGS. 6, 7 and 10, the second cover 70 is fixed on the body 2.

Specifically, as shown in FIGS. 6 and 7, the second divided section 72 of the second cover 70 is placed on the first divided section 62 of the first cover 60.

Moreover, as shown in FIGS. 2 and 10, the left and right end portions in the vehicle width direction of the connecting section 75 of the second cover 70 are supported on the left and right lower sections 40a of the left and right side roll bars 40 by having the left and right engaging portions 75a thereof engaged on the left and right lower sections 40.

Further, as shown in FIGS. 7 and 10, the upper end portion of the rear wall section 74 of the second cover 70 is fixed on the main body section 28a of the seat cushion frame 28 by inserting the trim clips (not shown) into the through holes of the fastening portions 74a of the rear wall section 74 respectively.

Further, as shown in FIGS. 3 and 10, the left and right end portions of the rear wall section 74 of the second cover 70 are fixed on the upwardly and downwardly extending part (not shown) connecting the main body section 28a of the seat cushion frame 28 and the left and right connecting sections 45c of the lower roll bar 45, by inserting the trim clips (not shown) into the through holes of the fastening portions 74b of the rear wall section 74 respectively.

Further, as shown in FIGS. 2 and 10, the middle portion in the upward and downward direction of the rear wall section 74 of the second cover 70 is fixed on the left and right lower sub-side frames 31 by inserting the trim clips (not shown) into the through holes of the fastening portions 74c of the rear wall section 74 respectively.

In addition, as shown in FIGS. 5, 6 and 10, the third fastening portions 72c of the second divided section 72 of the second cover 70 are fixed on the mounting portions 11a of the rear lower part of the left and right front fenders 11 in such a manner that the nuts (not shown) are screwed and tightened down on the bolts 99b passing through the through holes of the second divided section 72.

Then, as shown in FIG. 6, the second cover 70 is fixed on the first cover 60 and others.

Specifically, as shown in FIGS. 5 and 6, the first fastening portions 72a of the second divided section 72 of the second cover 70 are fixed on the first fastening portions 62a of the first divided section 62 by inserting the trim clips 98 into the through holes of the first fastening portions 72a and the through holes of the first fastening portions 62a of the first divided section 62 of the first cover 60.

Further, when the nuts (not shown) are screwed and tightened down on the bolts 99a passing through the through holes of the second fastening portions 72b of the second divided section 72 of the second cover 70 and the through holes of the second fastening portions 62b of the first divided section 62 of the first cover 60, both of the second fastening portions 72b of the second divided section 72 and the second fastening portions 62b of the first divided section 62 are fastened to and fixed on the mounting portions (not shown) located in each front part of the center sections 22a of the left and right side frames 22. The fitting of the floor 50 is completed by the above steps.

As explained above, according to an embodiment, the floor support structure of a vehicle 1 comprises the floor 50 extending in the vehicle width direction so as to allow the occupants Dr, Fp1, Fp2 sitting side by side in the vehicle width direction to put their feet thereon, the floor 50 containing the plane surface part and separating the vehicle interior IN from the vehicle exterior EX, the body 2 for supporting each of the front and rear end portions of the floor 50 in the forward and rearward direction of the vehicle and each of the left and right end portions of the floor 50 in the vehicle width direction, and the floor stay 80 making contact with the lower surface in or around the middle in the vehicle width direction of the floor 50 so as to support the floor 50, wherein the floor stay 80 comprises the plurality of main stays 81 which extend between the first section 21a of the body 2 located near the front end portion of the floor 50 in the forward and rearward direction of the vehicle and the second section 33a of the body 2 located near the rear end portion of the floor 50 in the forward and rearward direction of the vehicle so as to bear the load on the floor 50 from above, and the sub-stay 82 which extends between the main stays 81 located left and right in the vehicle width direction so as to restrain displacement in the vehicle width direction of each of the main stays 81.

With this construction, since the plurality of main stays 81 extend in the forward and rearward direction of the vehicle and are arranged at the spaced intervals in the vehicle width direction, the floor 50 extending in the vehicle width direction is supported in such a way as to distribute the load on the floor 50 from above, and the displacement of each of the main stays 81 in the forward and rearward direction of the vehicle can be restrained. Moreover, since the sub-stay 82 extends between the main stays 81 located left and right in the vehicle width direction so as to restrain the displacement in the vehicle width direction of each of the main stays 81, there is no need for the sub-stay 82 to be supported on the body 2 by the separate support member and the like. In addition, the floor 50 is a member containing the plane surface part, and the front and rear end portions of the floor 50 in the forward and rearward direction of the vehicle and the left and right end portions of the floor 50 in the vehicle width direction each are supported on the body. Therefore, the floor 50 is hardly displaced in the forward and rearward direction of the vehicle and in the vehicle width direction. Accordingly, the displacement of each of the component members in each of the forward and rearward direction of the vehicle and the vehicle width direction can be easily suppressed.

Further, in the above embodiment, the floor stay 80 is fastened to the floor 50 through at least one mounting portion 83 provided in the sub-stay 82.

Like this, since the floor stay 80 is fastened to the floor 50 at one place at least in the middle position in the vehicle width direction, the displacement of each of the floor stay 80 and the floor 50 in the forward and rearward direction of the vehicle and in the vehicle width direction can be easily suppressed.

Further, in the above embodiment, the floor 50 has the tunnel section 51 which extends in the forward and rearward direction of the vehicle in or around the middle in the vehicle width direction and which is convexed upwardly, and the floor stay 80 is arranged in the tunnel section 51.

Like this, since the floor stay 80 is arranged in the tunnel section 51, the displacement of each of the floor stay 80 and the floor 50 in each of the forward and rearward direction of the vehicle and the vehicle width direction can be easily and effectively suppressed.

Further, in the above embodiment, each of the main stays 81 and the sub-stay 82 is made of the wire rod of circular cross section, the sub-stay 82 is formed with the plurality of coiled engaging portions 84 each of which is wound in a state of forming the space equal to or greater than the diameter of each of the main stays 81, and each of the engaging portions 84 of the sub-stay 82 is configured to engage each of the main stays 81 of the floor stay 80.

Like this, since the plurality of the engaging portions 84 of the sub-stay 82 are configured to engage each of the main stays 81, special machining and fastening are not required.

Further, in the above embodiment, the floor 50 is divided at an intermediate position thereof in the forward and rearward direction of the vehicle into the first cover 60 on the front side and the second cover 70 on the rear side, and the first cover 60 and the second cover 70 overlap with each other at the divided sections 62, 72 thereof located at the intermediate position in the forward and rearward direction of the vehicle. In a condition where one of the first cover 60 and the second cover 70 is removed, the fastening portion 63 for fastening the sub-stay 82 is formed in the divided section 62 of the other 60 of the first cover 60 and the second cover 70.

In this manner, in a condition where one of the first cover 60 and the second cover 70 is removed, the sub-stay 82 can be easily mounted on the fastening portion 63 of the divided section 62 of the other of the first cover 60 and the second cover 70. In addition, even if the floor 50 is divided into the first cover 60 and the second cover 70, the first cover 60 and the second cover 70 overlap with each other at the divided sections 62, 72 thereof. Therefore, there is no need to provide a separate connecting member and the like, whereby the number of component parts is not increased.

Although, in the above embodiment, the description of the floor 50 is made with respect to an example of the front floor located in the front part in the forward and rearward direction of the vehicle, the present invention is not limited to the above. For example, some embodiments of the present invention may be applied to a rear floor located in the rear part in the forward and rearward direction of the vehicle and to a center floor located in the middle in the forward and rearward direction of the vehicle. Namely, certain embodiments may be applied to the floor 50 which extends in the vehicle width direction so as to allow the occupants Dr, Fp1, Fp2 sitting side by side in the vehicle width direction to put their feet thereon and which contains the plane surface part and separates the vehicle interior IN from the vehicle exterior EX.

Further, in the above embodiment, although the description is made with respect to an example of the floor stay 80 in which the sub-stay 82 is formed at the left and right end portions thereof with the plurality of coiled engaging portions 84 each of which is wound in a state of forming the space equal to or greater than the diameter of each of the main stays 81, and in which each of the engaging portions 84 of the sub-stay 82 is configured to engage each of the main stays 81, certain embodiments of the present invention are not limited to the above. For example, in addition to the left and right end portions in the vehicle width direction of the sub-stay 82, another coiled engaging portion 84 which is wound in a state of forming the space equal to or greater than the diameter of each of the main stays 81, may be further provided in a middle portion in the vehicle width direction of the sub-stay 82. In this construction of the floor stay 80, each of the engaging portions 84 located in the left and right end portions and in the middle portion in the vehicle width direction of the sub-stay 82 engage each of three main stays 81. Namely, certain embodiments may be applied to the floor stay 80 in which the sub-stay 82 is formed with the plurality of coiled engaging portions 84 each wound in a state of forming the space equal to or greater than the diameter of each of the main stays 81, and in which each of the engaging portions 84 of the sub-stay 82 is configured to engage each of the main stays 81.

Further, in the above embodiment, although the description is made with respect to an example in which, in a condition where the second cover 70 of the first cover 60 and the second cover 70 is removed, the fastening portion 63 for fastening the sub-stay 82 is formed in the first divided section 62 of the first cover 60, embodiments of the present invention are not limited to the above. For example, certain embodiments may be applied to the construction in which, in a condition where the first cover 60 of the first cover 60 and the second cover 70 is removed, the fastening portion for fastening the sub-stay 82 is formed in the second divided section 72 of the second cover 70. Namely, some embodiments may be applied to the construction in which, in a condition where one of the first cover 60 and the second cover 70 is removed, the fastening portion for fastening the sub-stay 82 is formed in the divided section of the other of the first cover 60 and the second cover 70.

Further, in the above embodiment, the number of the fastening portions and the mounting portions or the like and the arrangement positions or the like with respect to the floor 50, the body 2, the floor stay 80f, etc. are given only as examples, and modifications may be made properly to suite the situation.

The present invention is not limited to the above embodiment(s). For example, without limitation to the four-wheeled vehicle as described above, certain embodiments may be applied to various kinds of vehicles such as two-wheeled vehicle, three-wheeled vehicle and the like.

In addition, the construction in the above embodiment is given as an example of the present invention, and various changes and modifications in such a way as to replace the component elements of the above embodiment with well known component elements for example, may be made without departing from the spirit and scope thereof.

DESCRIPTION OF REFERENCE CHARACTERS

1: Vehicle, 2: Body, 21a: Section (First section) in or around the middle in the vehicle width direction of frame main body 21, 33*a*: Section (Second section) in or around the middle in the vehicle width direction of first upper cross frame 33, 50: Front floor (Floor), 51: Tunnel section, 60: First cover, 62: First divided section (Divided section), 63: Fastening portion, 70: Second cover, 72: Second divided section (Divided section), 80: Floor stay, 81: Main stay, 82: Sub-stay, 83: Mounting portion, 84: Engaging portion, Dr: Driver (Occupant), Fp1: First passenger (Occupant), Fp2: Second passenger (Occupant), EX: Vehicle exterior, IN: Vehicle interior

What is claimed is:

1. A floor support structure of a vehicle, the floor support structure comprising:
    a floor extending in the vehicle width direction so as to allow occupants sitting side by side in the vehicle width direction to put their feet thereon, the floor comprising a plane surface part and separating a vehicle interior from a vehicle exterior;
    a body configured to support each of front and rear end portions of the floor in a forward and rearward direction of the vehicle and each of left and right end portions of the floor in the vehicle width direction; and
    a floor stay making contact with a lower surface in or around the middle in the vehicle width direction of the floor so as to support the floor,
    wherein the floor stay comprises
    a plurality of main stays which extend between a first section of the body located near the front end portion of the floor in the forward and rearward direction of the vehicle and a second section of the body located near the rear end portion of the floor in the forward and rearward direction of the vehicle so as to bear a load on the floor from above, and a sub-stay which extends between the main stays located left and right in the vehicle width direction, and is configured to restrain displacement in the vehicle width direction of each of the main stays.

2. The floor support structure of a vehicle according to claim 1, wherein the floor stay is fastened to the floor through at least one mounting portion provided in the sub-stay.

3. The floor support structure of a vehicle according to claim 1, wherein the floor has a tunnel section which extends in the forward and rearward direction of the vehicle in or around the middle in the vehicle width direction and which is convexed upwardly, and the floor stay is arranged in the tunnel section.

4. The floor support structure of a vehicle according to claim 1, wherein each of the main stays and the sub-stay is made of a wire rod of circular cross section, the sub-stay is formed with a plurality of coiled engaging portions each of which is wound in a state of forming a space equal to or greater than a diameter of each of the main stays, and each of the engaging portions of the sub-stay is configured to engage each of the main stays of the floor stay.

5. The floor support structure of a vehicle according to claim 1, wherein the floor is divided at an intermediate position thereof in the forward and rearward direction of the vehicle into a first cover on the front side and a second cover on the rear side, and the first cover and the second cover overlap with each other at divided sections thereof located at the intermediate position in the forward and rearward direction of the vehicle, wherein, in a condition where one of the first cover and the second cover is removed, a fastening portion configured to fasten the sub-stay is formed in the divided section of the other of the first cover and the second cover.

6. A floor support structure of a vehicle, the floor support structure comprising:
    supporting means extending in the vehicle width direction for allowing occupants sitting side by side in the vehicle width direction to put their feet thereon, the supporting means comprising a plane surface part and separating a vehicle interior from a vehicle exterior;
    body supporting means for supporting each of front and rear end portions of the floor in a forward and rearward direction of the vehicle and each of left and right end portions of the supporting means in the vehicle width direction; and
    floor supporting means making contact with a lower surface in or around the middle in the vehicle width direction of the supporting means so as to support the supporting means,
    wherein the floor supporting means comprises a plurality of main stays which extend between a first section of the body supporting means located near the front end portion of the supporting means in the forward and rearward direction of the vehicle and a second section of the body supporting means located near the rear end portion of the supporting means in the forward and rearward direction of the vehicle so as to bear a load on the supporting means from above, and a sub-stay which extends between the main stays located left and right in the vehicle width direction, and is configured to restrain displacement in the vehicle width direction of each of the main stays.

7. The floor support structure of a vehicle according to claim 6, wherein the floor supporting means is fastened to the supporting means through at least one mounting means provided in the sub-stay.

8. The floor support structure of a vehicle according to claim 6, wherein the supporting means has a tunnel section which extends in the forward and rearward direction of the vehicle in or around the middle in the vehicle width direction and which is convexed upwardly, and the floor supporting means is arranged in the tunnel section.

9. The floor support structure of a vehicle according to claim 6, wherein each of the main stays and the sub-stay is made of a wire rod of circular cross section, the sub-stay is formed with a plurality of coiled engaging means each of which is wound in a state of forming a space equal to or greater than a diameter of each of the main stays, and each of the engaging means of the sub-stay engage each of the main stays of the floor stay.

10. The floor support structure of a vehicle according to claim 6, wherein the supporting means is divided at an intermediate position thereof in the forward and rearward direction of the vehicle into a first cover on the front side and a second cover on the rear side, and the first cover and the second cover overlap with each other at divided sections thereof located at the intermediate position in the forward and rearward direction of the vehicle, wherein, in a condition where one of the first cover and the second cover is removed, a fastening means for fastening the sub-stay is formed in the divided section of the other of the first cover and the second cover.

* * * * *